(12) United States Patent
Enoki et al.

(10) Patent No.: US 7,035,226 B2
(45) Date of Patent: Apr. 25, 2006

(54) PATH SETUP DEVICE AND METHOD FOR LABEL SWITCHING NETWORK

(75) Inventors: Tohru Enoki, Fukuoka (JP); Yoshio Aoyagi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 722 days.

(21) Appl. No.: 09/754,802

(22) Filed: Jan. 4, 2001

(65) Prior Publication Data

US 2001/0033574 A1    Oct. 25, 2001

(30) Foreign Application Priority Data

Apr. 12, 2000   (JP) .............................. 2000-110903

(51) Int. Cl.
*H04L 12/28* (2006.01)
*H04L 12/56* (2006.01)

(52) U.S. Cl. ...................... 370/254; 370/400; 370/401

(58) Field of Classification Search ................ 370/351, 370/389, 392, 396, 397, 398, 399, 395.3, 370/395.31, 400, 409; 379/272, 277; 709/238, 709/244; 711/203, 209, 221
See application file for complete search history.

(56) References Cited

U.S. PATENT DOCUMENTS

| 6,408,001 B1 * | 6/2002 | Chuah et al. ................ 370/392 |
| 6,683,874 B1 * | 1/2004 | Nagami et al. ............. 370/392 |
| 6,697,361 B1 * | 2/2004 | Fredette et al. ............. 370/389 |
| 6,735,190 B1 * | 5/2004 | Chuah et al. ................ 370/352 |

* cited by examiner

*Primary Examiner*—Chau Nguyen
*Assistant Examiner*—Soon D. Hyun
(74) *Attorney, Agent, or Firm*—Katten Muchin Rosenman LLP

(57) ABSTRACT

Upon reception of a label request for a new flow, a path setup device searches label switched paths (LPSs) which have already been set up for comparison with a path contained in the label request. If there exists an LSP of the same path as that in the label request, the same label as that of the LSP is allocated. If no such LSP exists, a new label is allocated. An LSP is set up based on the allocated label.

6 Claims, 47 Drawing Sheets

| DESTINATION NETWORK | NEXT HOP | COST |
|---|---|---|
| a | — | 1 |
| b | — | 1 |
| c | B | 2 |
| d | B | 2 |
| e | C | 2 |
| f | B | 3 |
| g | B | 3 |

FIG. 1E

PRIOR ART

|  | LABEL | PATH | FEC |
|---|---|---|---|
| LSR#1 | – | – | – |
| LSR#2 | – | – | – |
| LSR#3 | #a | #1–#2–#3 | A |

F I G. 7

|  | INCOMING LABEL | OUTGOING LABEL |
|---|---|---|
| L S R # 1 | — | # a |
| L S R # 2 | # a | # a |
| L S R # 3 | # a | — |

FIG. 8

|  | LABEL | PATH | FEC |
|---|---|---|---|
| LSR#1 | − | − | − |
| LSR#2 | − | − | − |
| LSR#3 | #a | #1−#2−#3 | A, B |

FIG. 9

|  | LABEL | PATH | FEC |
|---|---|---|---|
| LSR#1 | − | − | − |
| LSR#2 | − | − | − |
| LSR#3 | #a | #1−#2−#3 | A, B |
| LSR#4 | − | − | − |

FIG. 14

|  | INCOMING LABEL | OUTGOING LABEL |
|---|---|---|
| LSR#1 | – | #a |
| LSR#2 | #a | #a |
| LSR#3 | #a | – |
| LSR#4 | – | – |

FIG. 15

|  | LABEL | PATH | FEC |
|---|---|---|---|
| LSR#1 | – | – | – |
| LSR#2 | – | – | – |
| LSR#3 | #a | #1-#2-#3 | A |
| LSR#4 | – | – | – |

FIG. 16

| LABEL | FEC |
|-------|------|
| #a | A, B |

FIG. 17

|  | LABEL | PATH | FEC |
|---|---|---|---|
| LSR#1 | — | — | — |
| LSR#2 | — | — | — |
| LSR#3 | #a | #1-#2-#3 | A |
| LSR#4 | #b | #1-#2-#3-#4 | B |

FIG. 18

|  | INCOMING LABEL | OUTGOING LABEL |
|---|---|---|
| LSR#1 | — | #a |
|  | — | #b |
| LSR#2 | #a | #a |
|  | #b | #b |
| LSR#3 | #a | — |
|  | #b | #b |
| LSR#4 | — | — |
|  | #b | — |

FIG. 19

|  | LABEL | PATH | FEC |
|---|---|---|---|
| LSR#1 | — | — | — |
| LSR#2 | — | — | — |
| LSR#3 | #a | #1-#2-#3 | A |
|  | #b | #1-#2-#3 | B |

FIG. 25

|  | INCOMING LABEL | OUTGOING LABEL |
|---|---|---|
| LSR#1 | — | #a |
|  | — | #b |
| LSR#2 | #a | #a |
|  | #b | #b |
| LSR#3 | #a | — |
|  | #b | — |

FIG. 26

|  | LABEL | PATH | FFC |
|---|---|---|---|
| LSR#1 | – | – | – |
| LSR#2 | – | – | – |
| LSR#3 | #a | #1-#2-#3 | A |
| | #b | #1-#2-#3 | B |
| | #c | #1-#2-#3 | C |

FIG. 30

|  | INCOMING LABEL | OUTGOING LABEL |
|---|---|---|
| LSR#1 | – | #a |
|  | – | #b |
|  | – | #c |
| LSR#2 | #a | #a |
|  | #b | #b |
|  | #c | #c |
| LSR#3 | #a | – |
|  | #b | – |
|  | #c | – |

FIG. 31

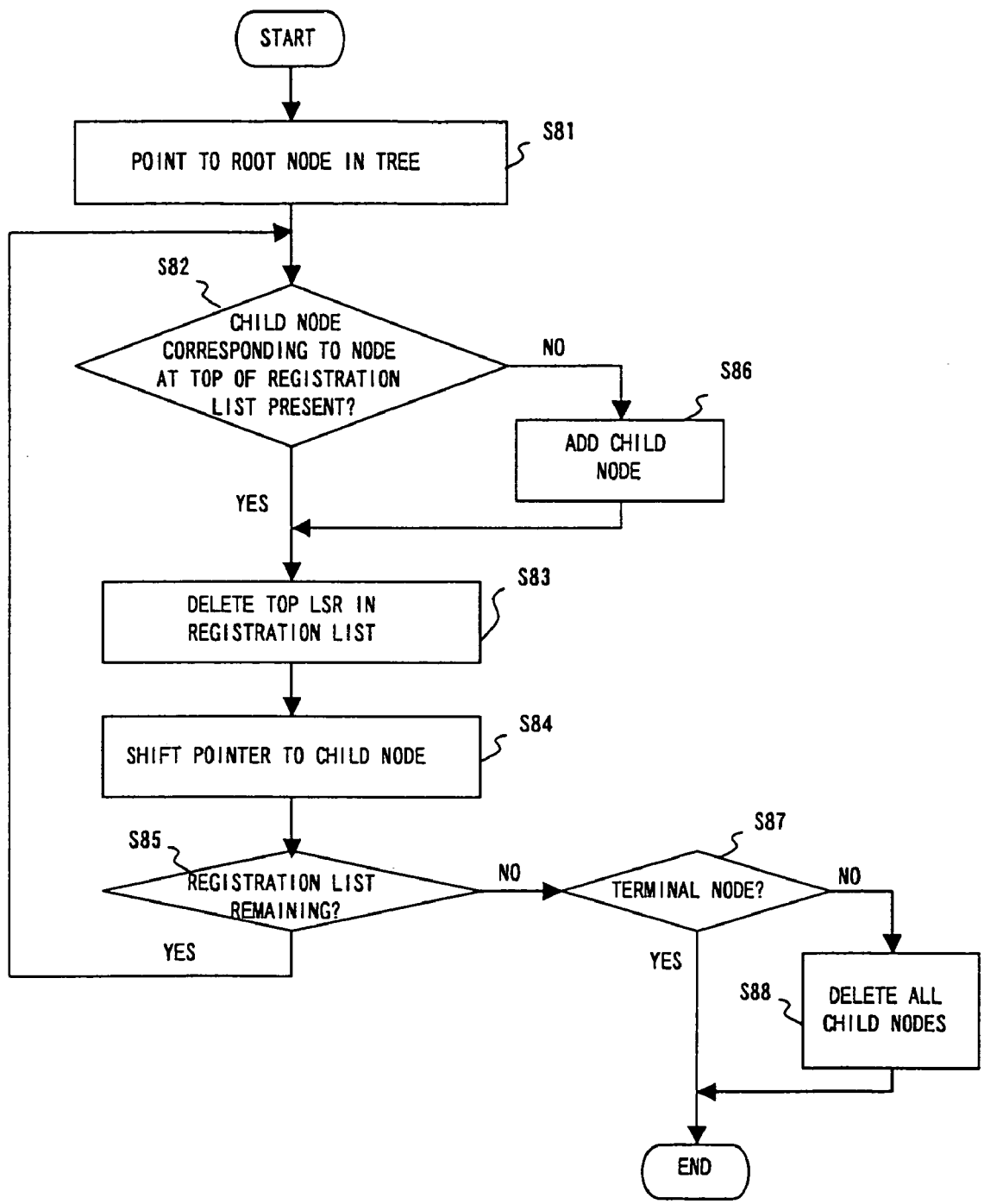
F I G. 37

| LSP NUMBERS | 10 | 20 | 30 | 40 | 50 |
|---|---|---|---|---|---|
| CONVENTIONAL TECHNIQUE | 1917 | 8987 | 21257 | 38727 | 61397 |
| INVENTION | 90 | 380 | 870 | 1560 | 2450 |
| CONVENTIONAL TECHNIQUES/INVENTION(a) | 21.3 | 23.7 | 24.4 | 24.8 | 25.1 |

FIG. 39

| LSR NUMBERS | 10 | 20 | 30 | 40 | 50 |
|---|---|---|---|---|---|
| CONVENTIONAL TECHNIQUES | 7362 | 347732 | 823302 | 1500072 | 2380042 |
| INVENTION | 90 | 380 | 870 | 1560 | 2450 |
| CONVENTIONAL TECHNIQUES/INVENTION (a) | 81.8 | 91.4 | 94.6 | 96.2 | 97.2 |

FIG. 41

PATH SETUP DEVICE AND METHOD FOR LABEL SWITCHING NETWORK

BACKGROUND OF THE INVENTION

1. Field of the Invention

The present invention relates to a device and method for setting up label switched paths (LSPs) in a label switching network and, more specifically, to a device and method for setting up LSPs through the use of a distance vector type routing protocol in an IP (Internet Protocol) network that includes a plurality of label switching routers (LSRs).

2. Description of the Related Art

FIG. 1A shows a conventional IP packet transfer in an IP network. In FIG. 1A, when IP packet transfer is made by routers #1, #2, and #3, each router refers to the destination address set in each IP packet and performs software-based transfer processing in the third layer of the basic reference model of OSI (Open System Interconnection).

In contrast, in multi-protocol label switching (MPLS), which is now being standardized, a fixed-length label of 20 bits is allocated for an IP packet flow specified by an FEC (Forwarding Equivalence Class).

An FEC specifies a group of IP packets, such as the flow of IP packets for an individual application or the flow of IP packets having the same destination network. Each router performs fixed-length-label-based switching in the 2.5-th layer by hardware. In such a label switching network, a path that can make packet transfer using a label is referred to as an LSP.

FIG. 1B shows an IP packet transfer by routers for MPLS. In FIG. 1B, routers #1, #2 and #3 correspond to an ingress LSR, transit LSR, and egress LSR, respectively.

Here, the ingress LSR is one that attaches a label to a packet with no label at the entrance of an LSP. The egress LSR is one that removes the label from the labeled packet at the exit of the LSP. The transit LSR is located between the ingress and egress LSRs and transfers the labeled packet.

For example, the router #1 attaches a label #a to an incoming IP packet 1 with no label and then transfers the resulting IP packet 2 to the router #2. The router #2 changes the label of the received IP packet 2 to #b and then transfers the resulting IP packet 3 to the router #3. The router #3 removes the label from the received IP packet 3 and then transfers the resulting packet 4 with no label to the destination network. Thus, IP packets can be transferred at high speed by performing switching using fixed-length labels.

When combined with a routing protocol, the MPLS can recognize the network topology to set up LSPs automatically. The routers can benefit from high-speed routing only by making the setting of the MPLS function effective. Thus, this function is expected to be in increasing demand and become the future standard function of routers.

Routing protocols that are combined with MPLS include open shortest path first (OSPF) protocols, routing information protocols (RIP), etc.

The OSPF, in such a network configuration as shown in FIG. 1C by way of example, creates such a shortest path tree as shown in FIG. 1D to compute the shortest route to a destination network. In FIG. 1C, A, B, C, D, E and F represent routers and a, b, c, d, e, f and g represent router-to-router networks. The numerical value associated with each network indicates the transfer cost for that network.

The shortest path tree of FIG. 1D, provided in the router A, hold the shortest route for which the transfer cost is minimum when an IP packet is transferred from the router A to another router. For example, the shortest route from router A to router C is the route from A through B to C and the transfer cost is 20. This value is determined by adding together the cost for the network a between the routers A and B and the cost for the network c between the routers B and C. In the same manner, the shortest path tree is provided for other routers.

In the combination of OSPF and MPLS, each router can refer to the shortest path tree to set up a single LSP for networks that the same router accommodates. Thus, the LSPs can be prevented from increasing in number.

On the other hand, RIP is a distance vector type routing protocol, which is a routing protocol that, in order to cause a frame (IP packet) to arrive at its destination network, manages only the next router (next hop) and the distance (the number of hops) to the destination network.

The RIP determines next hops by creating such a routing table as shown in FIG. 1E in the network of FIG. 1C. The routing table of FIG. 1E is provided in the router A and manages the next hop and cost for each destination network. Here, the number of hops is used as the cost instead of the cost value in FIG. 1C. The RIP is now the most used protocol owing to ease of management and installation and is expected to continue being used in the future as well.

However, the aforementioned conventional routing protocols have the following problems:

The OSPF protocol is very difficult to manage at its operation time because of complexity of its specifications. For this reason, the OSPF is little used at present. Also, since installation itself is difficult, the combination with the MPLS involves much complexity.

On the other hand, in the combination of a distance vector type routing protocol, such as RIP, with the MPLS, it is impossible for the ingress LSR to identify a router that accommodates the destination network. For this reason, even with networks under the same egress LSR, an LSP is to be set up and a different label is to be allocated for each network address. Thus, when the number of networks accommodated by a router is increased, a large number of labels would have to be used.

With MPLS, in order to swap the label in the transit LSR, one might suggest using a label lookup table by which the label (outgoing label) of the outgoing IP packet to the next hop is retrieved according to the label (incoming label) of the incoming IP packet.

However, when a large number of labels is used as described above, the number of entries in the label lookup table increases, increasing the time required for retrieval and lowering the packet transfer capability.

SUMMARY OF THE INVENTION

It is an object of the present invention to provide a path setup device and method which improve the transfer capability by reducing the number of labels used in a label switching network which uses a label switching technique, such as MPLS, and a distance vector type routing protocol in combination.

The path setup device of the present invention includes a decision device and a label allocation device to set up LSPs in a label switching network including a plurality of routers.

The decision device, when receiving a label request, makes a decision as to whether there exists an LSP which has already been set up which has the same path as a path corresponding to the label request. The label allocation device, in the presence of such an LSP, allocates the same label as that of the LSP for the label request.

BRIEF DESCRIPTION OF DRAWINGS

FIG. 7 shows a first label table;

FIG. 8 shows a first label lookup table;

FIG. 9 shows a second label table;

FIG. 14 shows a third label table;

FIG. 15 shows a second label lookup table;

FIG. 16 shows a fourth label table;

FIG. 17 shows a label-to-FEC table;

FIG. 18 shows a fifth label table;

FIG. 19 shows a third label lookup table;

FIG. 25 shows a sixth label table;

FIG. 26 shows a fourth label lookup table;

FIG. 30 shows an seventh label table;

FIG. 31 shows a fifth label lookup table;

FIG. 37 is a flowchart for registration;

FIG. 39 is a first table of the number of LSPs;

FIG. 41 is a second table of the number of LSPs; and

DESCRIPTION OF THE PREFERRED EMBODIMENTS

The preferred embodiments of the present invention are described in detail below with reference to the drawings.

Figure 1A:
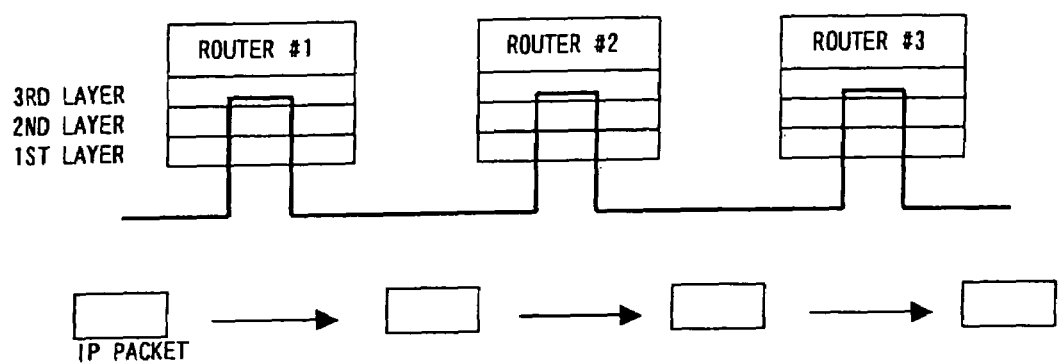
FIG. 1A shows conventional IP packet transfer.
Figure 1:
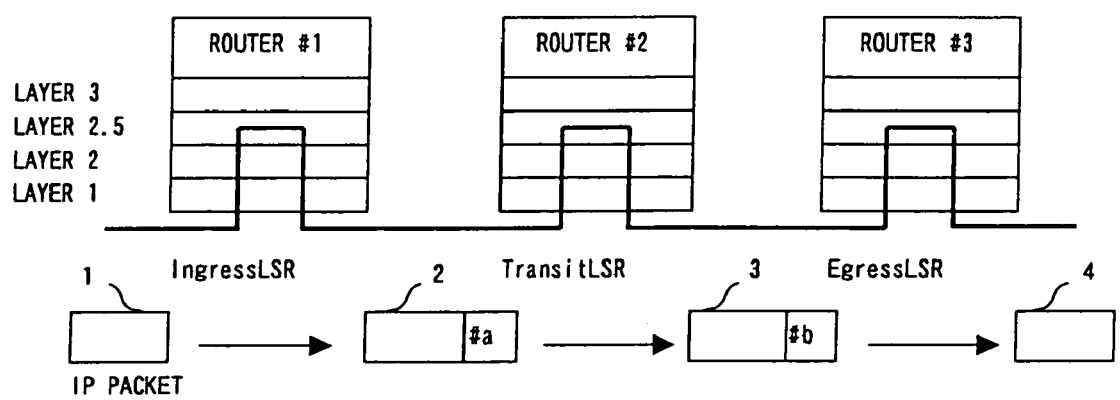
FIG. 1B shows IP packet transfer by MPLS.
FIG. 1C shows a network configuration and the cost associated with each network.
FIG. 1D shows the shortest path trees.
FIG. 1E shows a routing table.
Figure 1C:
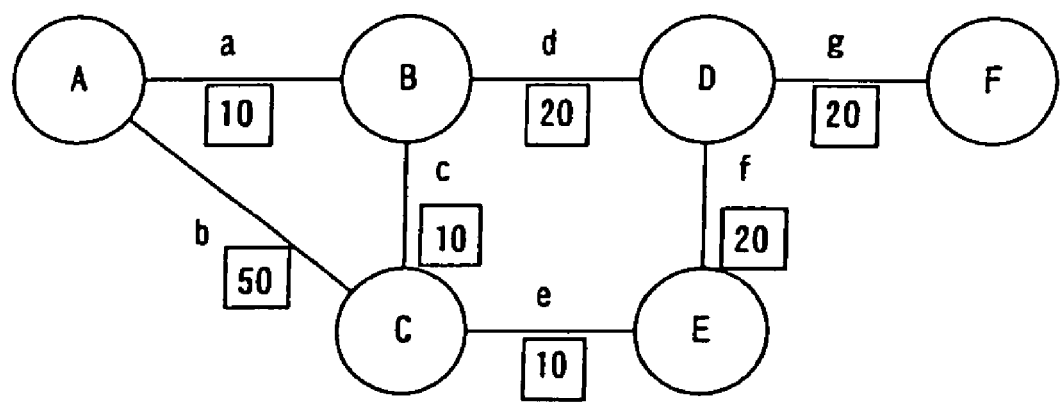
Figure 1D:
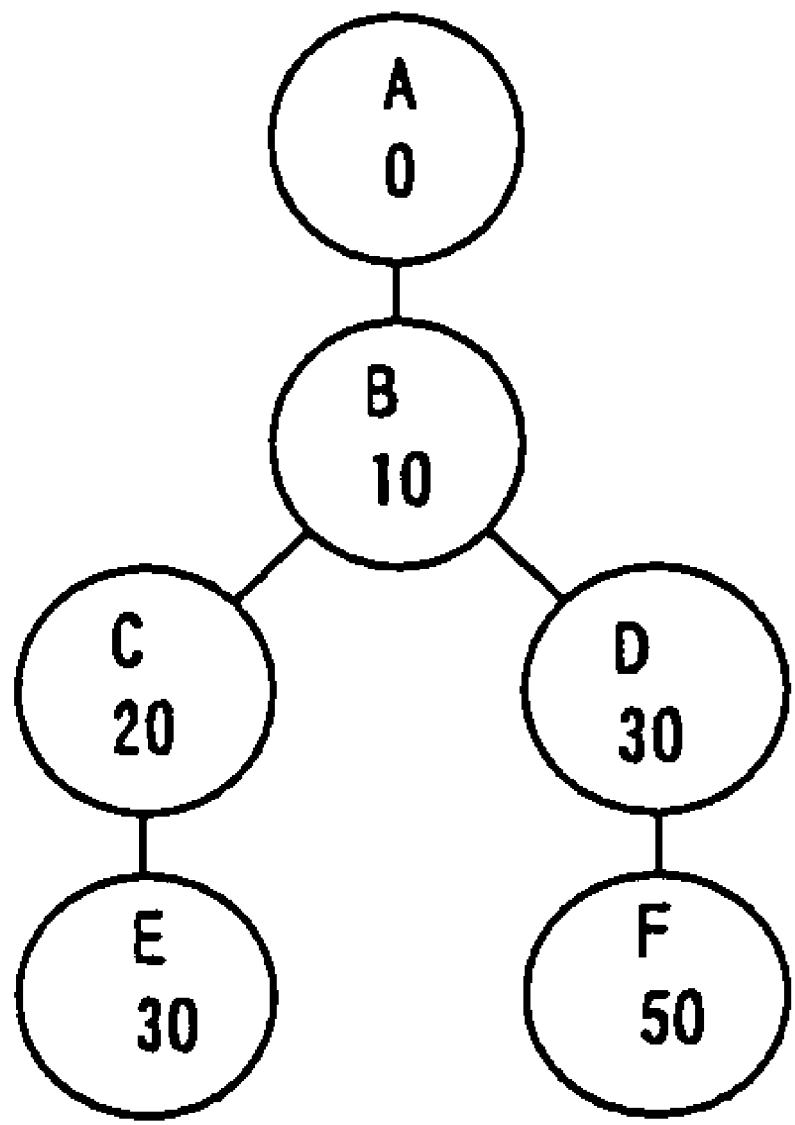
Figure 2:
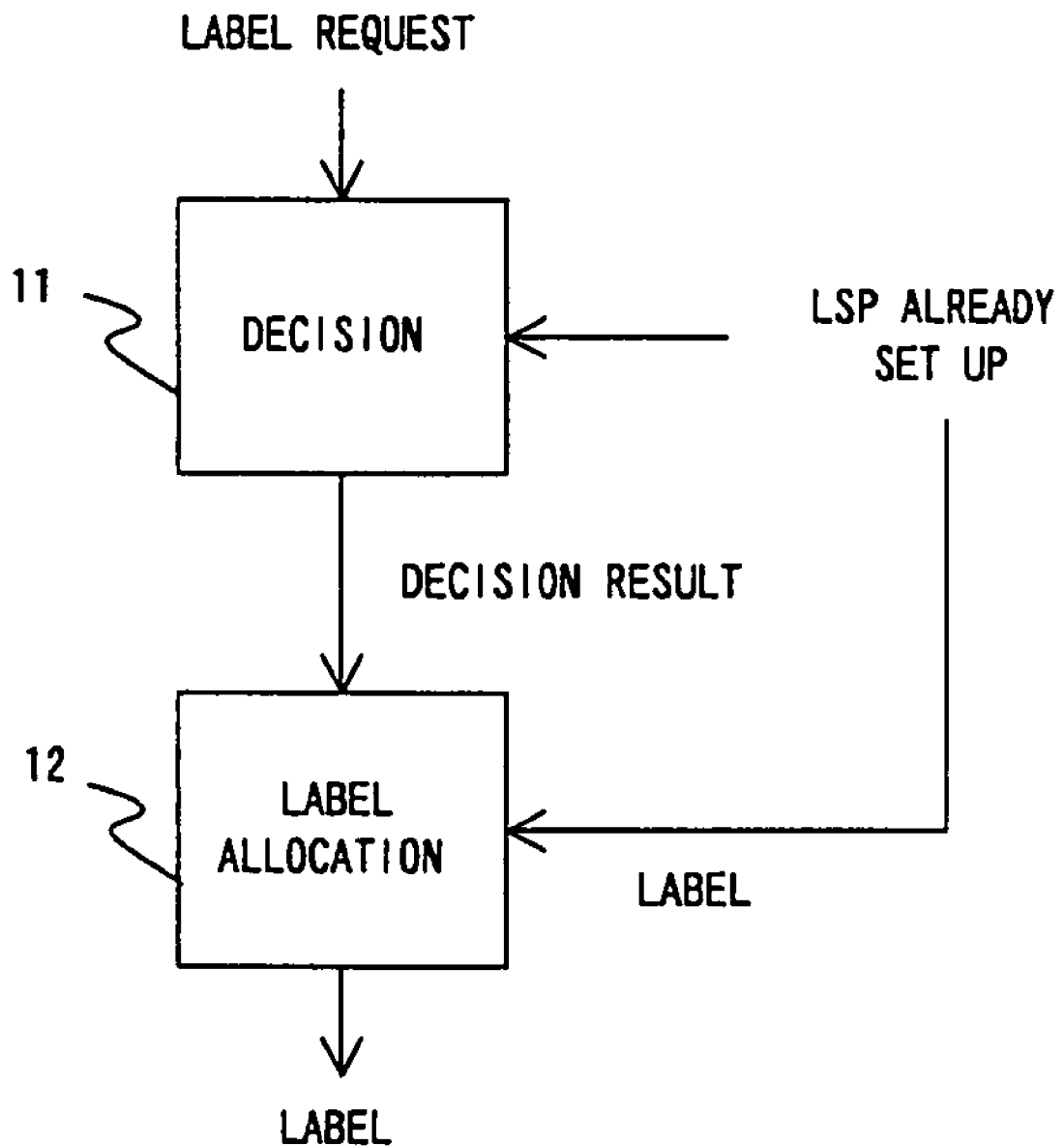
FIG. 2 is a diagram for use in explanation of the principle of a path setup device of the present invention.

Referring now to FIG. 2, there are illustrated the principle of a path setup device of the present invention, which includes a decision device 11 and a label allocation device 12 to set up LSPs in a label switching network containing a plurality of routers.

The decision device is responsive to reception of a label request to make a decision of the presence or absence of an LSP which has already been set up which has the same path as a path corresponding to the label request. If the decision indicates that such an LSP is present, then the label allocation device 12 allocates the same label as that of the LSP already set up for the label request.

The path setup device, which is provided in, for example, each router, receives a label request from another router at the time of setup of an LSP for a new flow of packets. The decision device 11 determines a path for the new flow from information contained in the label request, refers to LSPs already set up to make a decision of the presence or absence of an LSP of the same path as the path for the new flow, and presents the result to the label allocation device 12. In the presence of such an LSP, the label allocation device 12 allocates the same label as that for the LSP already set up for the new flow. In the absence of such an LSP, on the other hand, a new label is allocated for the new flow.

According to such a path setup device, even if a distance vector type routing protocol is used, the same label can be allocated for two or more flows bound for different networks accommodated by the same router. Thereby, the number of labels used can be reduced and the network transfer capability can be improved.

The decision device 11 and the label allocation device 12 of FIG. 2 correspond to an identical path confirmation section 28 and a label management section 23, respectively, of FIG. 3B which will be described later.

In the present embodiment, in a label switching network using a distance vector type routing protocol, the same label is allocated for two or more FECs of the same path. This reduces the number of labels used and improves the network transfer capability.

Figure 3A:
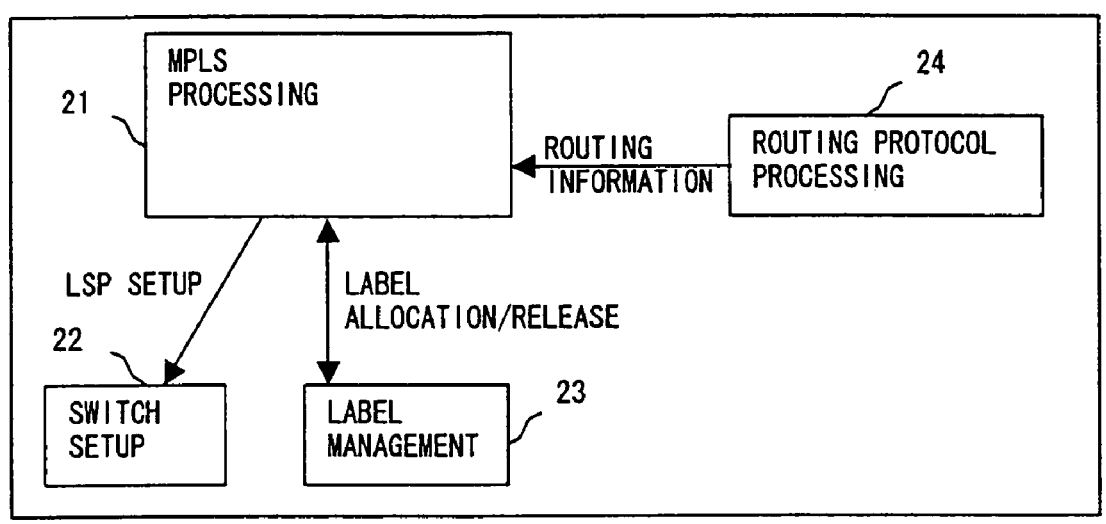
FIG. 3A is a diagram for use in explanation of first label control.

FIG. 3A shows label control when the MPLS and the routing protocol of distance vector type are combined in LSR. An MPLS processing section 21 makes a request to the label management section 23 to allocate/release a label. The label management section 23 presents the result of the requested processing to the MPLS processing section 21. Also, the MPLS processing section 21 makes a request to a switch setup section 22 to set up an LSP. The switch setup section 22 sets up the requested LSP. A routing protocol processing section 24 presents routing information to the MPLS processing section 21.

Figure 3B:
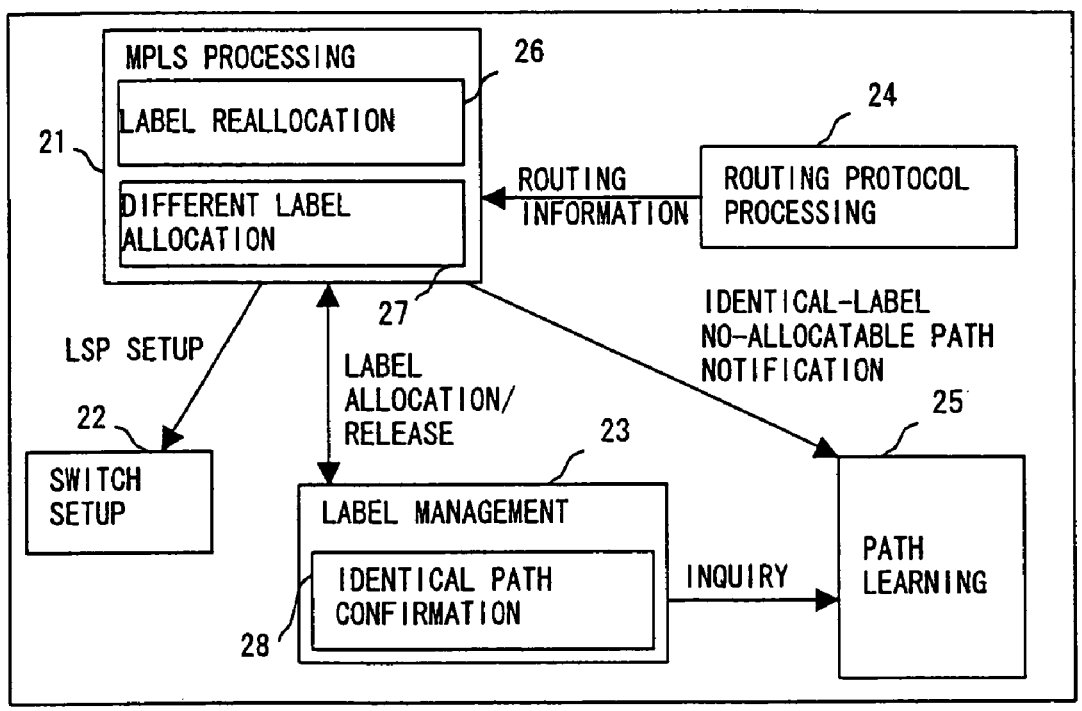
FIG. 3B is a diagram for use in explanation of second label control.

FIG. 3B shows the arrangement in the label control of FIG. 3A for reducing the number of labels used by allocating the same label for two or more FECs. In FIG. 3B, a path learning section 25 is added. The MPLS processing section 21 has a label reallocation section 26 and a different-label allocation section 27 built in. The label management section 23 has an identical path confirmation section 28 built in.

When a new FEC is added and the egress LSR receives a label request message, the MPLS processing section 21 makes a request to the label management section 23 for label allocation. The label management section 23 inquires of the identical path confirmation section 28 as to the presence or absence of an LSP of the same path.

Here, a path means a route of a frame. When there are two or more paths between the ingress LSR and the egress LSR, an LSP can exist on each path. If two or more LSPs exist on one path, these LSPs are referred to as LSPs of the same path. In contrast, LSPs on different paths are referred to as LSPs of different paths.

The identical path confirmation section 28 searches for an LSP already set up and makes a comparison between the path of the LSP and a path contained in the label request message to automatically confirm whether they are identical. Here, that two paths are identical means that the combination of the ingress LSR and the egress LSR is the same for the two paths and routers on the path from the ingress LSR to the egress LSR are the same.

In the absence of an LSP of the same path, the label management section 23 assigns a new label and presents it to the MPLS processing section 21. In the presence of an LSP of the same path, the label management section 23 inquires of the path learning section 25 as to whether the same label as that of the LSP can be allocated.

The path learning section 25 automatically studies paths for which the same label cannot be allocated, and responds whether or not the path inquired about is allowed to be allocated the same label. According to the response from the path learning section 25 of whether the allocation of the identical label is allowed or disallowed, the label management section 23 allocates the same label or a different label and presents the allocated label to the MPLS processing section 21.

The MPLS processing section 21 makes a request to the switch setup section 22 for LSP setup on the basis of the label presented from the label management section 23. The switch setup section 22 then set up an LSP on a switch. The MPLS processing section 21 notifies another LSR of the label through a label mapping message. The switch setup section 22 in the LSR that received the message sets up an LSP based on the received label.

Thus, by making a check for the presence of an LSP of the same path as an added FEC by the identical path confirmation section 28 and allocating the same label as that of the LSP already present, two or more FECs can be allocated the same label. Thereby, the number of labels used can be reduced.

Also, the MPLS processing section 21 reperforms label allocation processing from the ingress LSR using the label reallocation section 26 when a topology change occurs for a certain FEC of two or more FECs that share the same label.

If, when the same label is allocated for two or more FECs in the egress LSR, a topology change occurs to change the path of a certain FEC, then the label reallocation section 26 changes the association between the labels and the FECs.

The MPLS processing section 21 sends a label withdraw message to the upstream LSRs to release temporarily all the labels for the FEC in the path from the egress LSR to the ingress LSR and prompts the ingress LSR to reperform LSP setup. Thereby, label allocation is made again between the ingress LSR and a new egress LSR. Thus, the provision of the label reallocation section 26 allows changes in network topology to be accommodated, allowing label sharing after LSP setup has been reperformed.

When receiving a label release message from an LSR that does not support the identical-label allocation function, the MPLS processing section 21 uses the different-label allocation section 27 to allocate a different label for subsequent label request messages regarding the same path.

When the egress LSR sends a label mapping message in which the same label is allocated and receives a label release message from an LSR, the MPLS processing section 21 judges that there exists an LSR with no identical-label allocation function on the path. The different-label allocation section 27 presents that path to the path learning section 25.

In this case, the path learning section 25 registers the presented path as an identical-label non-allocatable path and, when inquired from the label management section 23, responds that the registered path cannot be allocated the same label. Therefore, a different label is allocated for the next label request message regarding that path. Thus, the provision of the different-label allocation section 27 allows LSP setup for an LSR that does not support the identical-label allocation function.

In addition, the path learning section 25 can also automatically learn LSRs that do not support the identical-label allocation function. In this case, the path learning section 25 retains paths presented from the different-label allocation section 27 in the form of tree structure. When inquired from the label management section 23, the path learning section 25 checks the tree to ensure that the inquired path can be allocated the same label and notifies the label management section 23 of the result.

At this point, if at least a portion of the inquired path has been entered into the tree, then the path learning section 25 responds that the same label is non-allocatable. Thus, since a different label is allocated for such a path from the time of receipt of the first label request message, failure to allocate the same label can be prevented.

Figure 4:
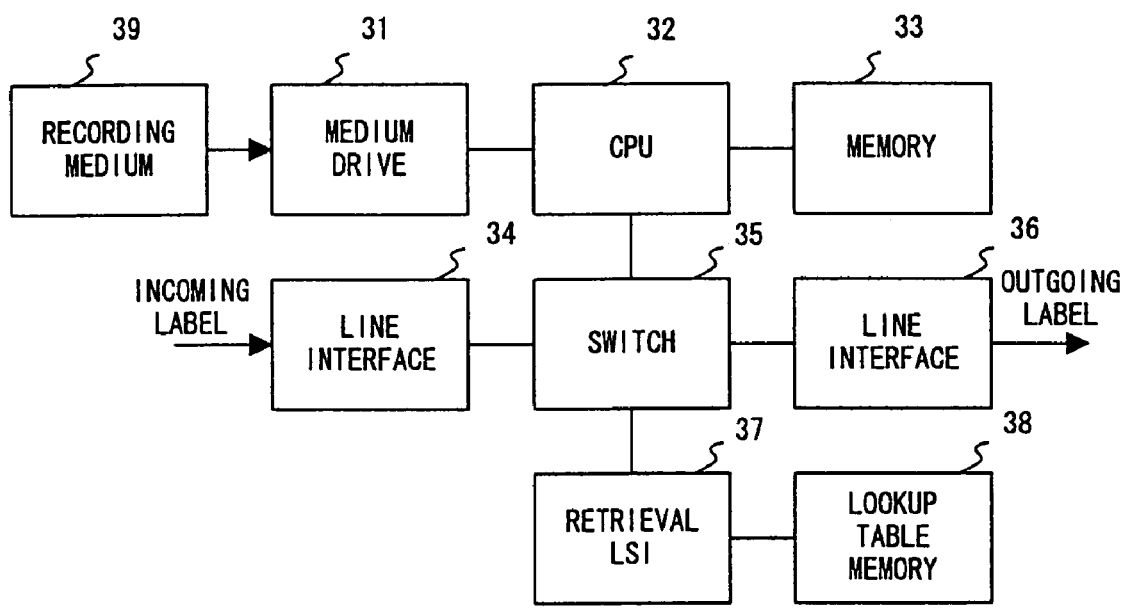
FIG. 4 is a block diagram of an LSR.

FIG. 4 is a block diagram of such an LSR as described above, which comprises a medium drive 31, a CPU (Central Processing Unit) 32, a memory 33, line interfaces 34 and 36, a switch 35, a retrieval LSI (Large Scale Integration) 37, and a lookup table memory 38.

The line interface 34 passes frames received from lines in a network on the input side to the switch 35, while the line interface 36 sends frames received from the switch 35 over lines in a network on the output side.

The switch 35 passes the label (incoming label) of a receive frame to the retrieval LSI 37 to determine the label (outgoing label) for a transmit frame. The label from the LSI is attached to the transmit frame and the resulting transmit frame is passed to the line interface 36.

The lookup table memory 38 holds a label lookup table for looking up an outgoing label corresponding to an incoming label. The retrieval LSI 37 refers to the label lookup table to determine the outgoing label corresponding to the incoming label received from the switch 35 and passes it to the switch 35.

The memory 33 includes, for example, a ROM (Read Only Memory), a RAM (Random Access Memory), etc., and stores programs and data used for processing by the CPU 32. The CPU 32 executes the programs using the memory 33 to carry out required processing.

In this case, the MPLS processing section 21, the switch setup section 22, the label management section 23, the routing protocol processing section 24, the path learning section 25, the label reallocation section 26, the different-label allocation section 27, and the identical-path confirmation section 28 shown in FIG. 3B are stored as program-described software components in the memory 33. The memory 33 holds information such as labels corresponding to egress operation LSPs in the form of a label table. The egress operation LSPs will be described later.

The medium drive 31 drives a portable recording medium 39 and makes access to the recorded contents. As the portable recording medium 39 use may be made of any computer-readable recording medium, such as a memory card, a floppy disk, a CD-ROM (Compact Disk Read Only Memory), an optical disk, or a magneto-optical disk. For example, the user or administrator stores the above programs and data on the portable recording medium 39, which, when used, are loaded into the memory 33.

The operation of the LSR based on the arrangement of FIGS. 3B and 4 will be described in detail below with reference to FIGS. 5 through 37. FIGS. 5 through 11 show an example of identical label allocation in the combination of the MPLS and the distance vector type routing protocol.

Figure 5:
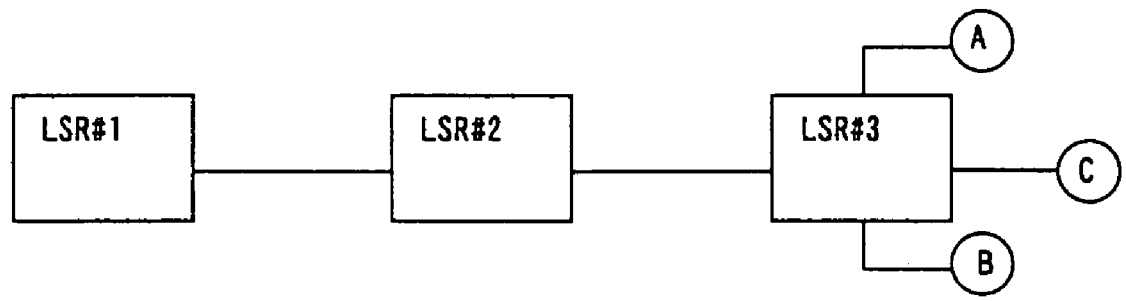
FIG. 5 shows a first network configuration.
Figure 6:
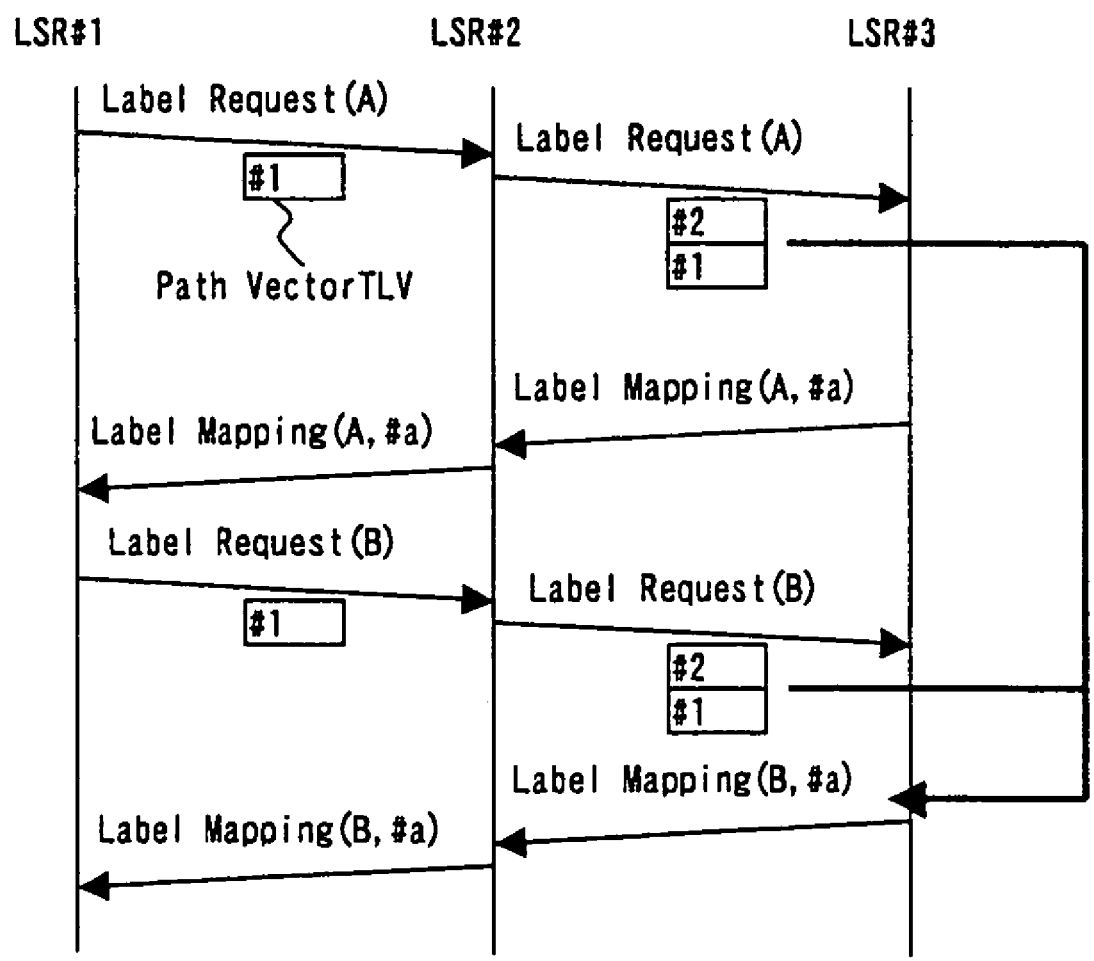
FIG. 6 shows a first message sequence.

Considers that, in such a network configuration as shown in FIG. 5, only the path to network A is present at first, then the path to network B is added. In this case, LSR#1, LSR#2 and LSR#3 correspond to the ingress LSR, transit LSR, and egress LSR, respectively. The LSR#3 accommodates networks A, B, and C. FIG. 6 shows a sequence of messages communicated among those LSRs.

First, the LSR#1 sends a label request message for the flow (FEC) to be directed to network A. The message contains identification information A for the destination network and a path vector TLV representing a list of LSRs through which the message passed. TLV (Type-Length-Value) corresponds to encoded data.

The list of LSRs is described, for example, as a list of LSR identification information such as IP addresses. Here, the identification information for LSR#1, LSR#2, and LSR#3 are #1, #2, and #3, respectively. The path vector that the LSR#3 receives is described as #2–#1.

The MPLS processing section 21 in the LSR#3 that received the label request message passes the LSR list contained in the message to the label management section 23 as path information and requests the section 23 to allocate a label for the corresponding flow. At this point, since no LSP has bee set up in the LSR#3, no label has been entered into the label table in the memory 33.

The identical-path confirmation section 28 in the label management section 23 that received the path information adds LSR#3 to the top of the received LSR list and creates a path #1–#2–#3 by reversing the arrangement of elements in the list. Next, the label table is checked to ensure that there is no LSP of the same path as the created path. The label management section 23 then notifies the MPLS processing section 21 that a label #a is allocated anew and adds the label #a to the label table.

The MPLS processing section 21 requests the switch setup section 22 to set up an LSP and sends a label mapping message to the LSR#1 through the LSR#2. The label mapping message contains the identification information A for the destination network and the allocated label #a. The label table in each LSR at this point is illustrated in FIG. 7.

Figure 7:
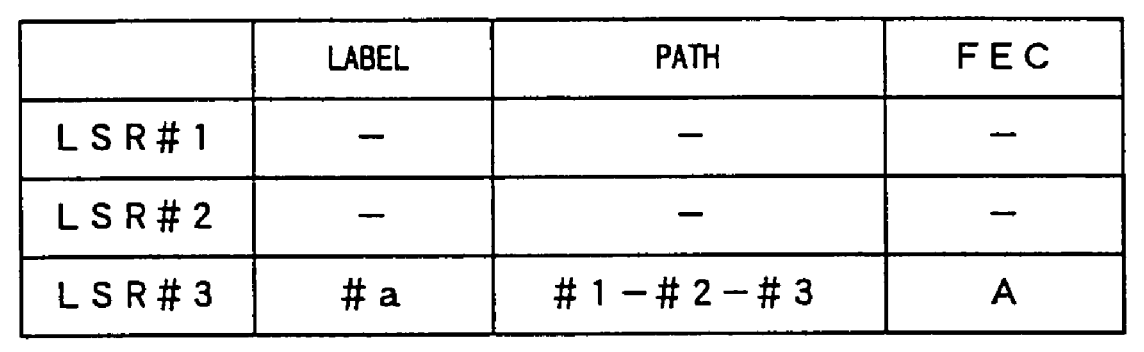

In FIG. 7, the label tables in the three LSRs are shown taken together. However, in practice, only information on a row corresponding to each LSR is stored in its label table. Here, the LSP set up by the LSR#3 performs an egress operation in the LSR#3 only, but not in the LSR#1 and LSR#2. Thus, no information is stored in the label tables in the LSR#1 and LSR#2. In the label table in the LSR#3, the label #a, the path of the LSP and the FEC are stored.

In the label table of the LSR#3, "#1–#2–#3" in the column on path represents that the path of the label #a is one to transfer a frame from LSR#1 through LSR#2 to LSR#3. "A" in the column on FEC represents that the FEC designates the flow destined for network A.

The switch setup section 22 in each LSR sets up such a lookup table as shown in FIG. 8 in its lookup table memory 38. Thereby, the LSP is set up. In FIG. 8 as well, the label lookup tables in the three LSRs are shown taken together; however, in practice, as in the case of FIG. 7, only information on a row corresponding to each LSR is stored in its label lookup table.

Since the LSR#1 corresponds to the ingress LSR, only the outgoing label is stored in its label lookup table. Since the LSR#3 corresponds to the egress LSR, only the incoming label is stored in its label lookup table. Since the LSR#2 is the transit LSR, both the incoming and outgoing labels are stored in its label lookup table.

In this case, the LSP which has been set up using the label #a is called the ingress operation LSP in the ingress LSR#1, the transit operation LSP in the transit LSR#2, and the egress operation LSP in the egress LSR#3.

Next, in order to add a path to the network B, the LSR#1 sends a label request message for the flow bound for the network B as with the flow bound for the network A. The MPLS processing section 21 in the LSR#3 that received the message passes a list of LSRs contained in the message to the label management section 23 to make a request for allocation of a label.

Next, the identical-path confirmation section 28 examines the label table of FIG. 7 and then judges that there exists an LSP of the same path as path information received. The label management section 23 then inquires of the path learning section 25 as to whether the same label is allocatable.

The path learning section 25 holds an identical-label non-allocatable path tree made up of paths such that there exist LSRs with no identical-label allocation function on the way. In response to the inquiry from the label management section 23, the path learning section searches the tree, then, if the path that the label management section has inquired about is not present on the tree, judges that the same label is allocatable and notifies the label management section 23 of that fact. The search processing will be described in detail later.

Upon receipt of a reply from the path learning section 25 that the same label is allocatable, the label management section 23 determines to allocate the same label #a as that allocated to the flow bound for the network A for the flow bound for the network B. The label management section then notifies the MPLS processing section 21 of the label and updates the label table.

The MPLS processing section 21 sends a label mapping message containing the destination B and the label #a to the LSR#1 through the LSR#2. The contents of the label tables of the respective LSRs at this point are as depicted in FIG. 9.

Figure 9:
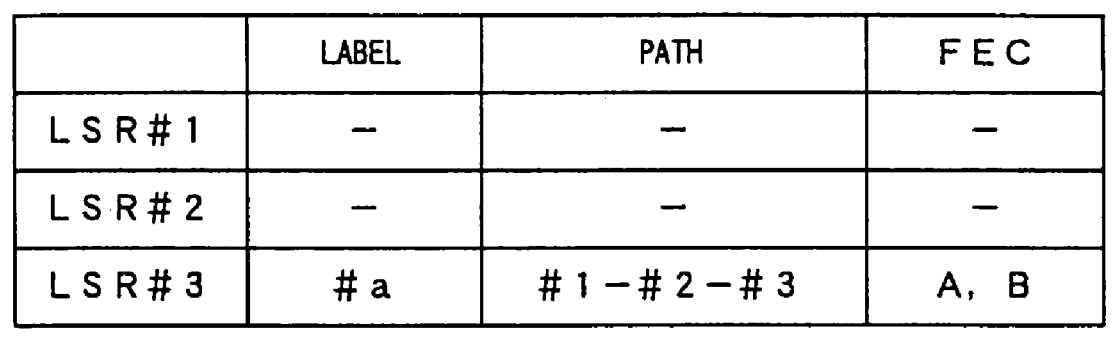

As shown in FIG. 9, no change is made to the label tables of the LSR#1 and LSR#2, and "B" is added as FEC of the label table of the LSR#3. Thus, the same label has been allocated for two different FECs. Since a new label has not been allocated, no change is made to the label lookup table of FIG. 8.

Figure 10:
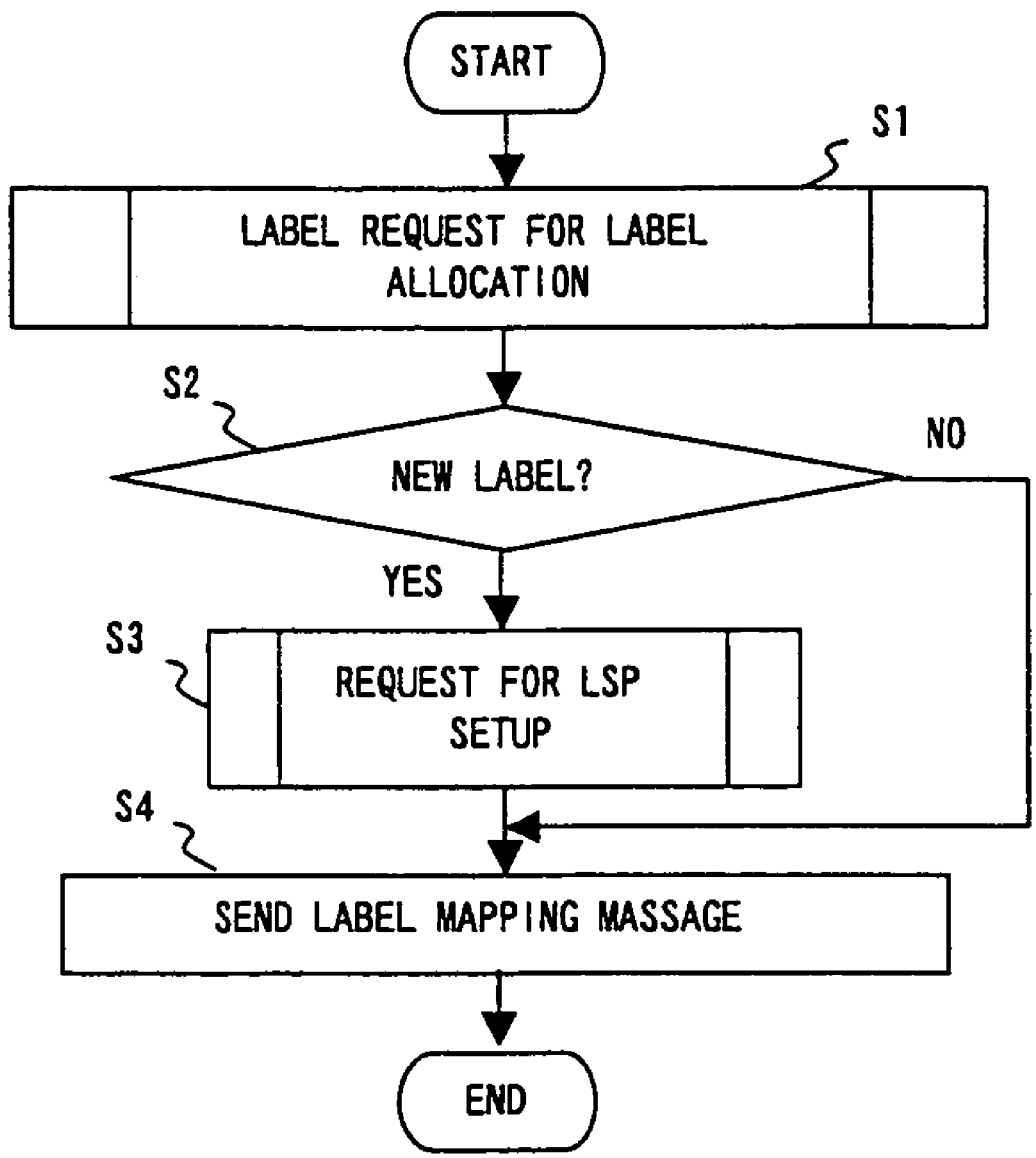
FIG. 10 is a flowchart for the first processing by the MPLS processing section.

FIG. 10 is a flowchart for the processing by the MPLS processing section 21 which has received a label request message. The MPLS processing section 21 first makes a request to the label management section 23 for label allocation to receive an allocated label (step S1) and then determines if the received label is a new one (step S2).

If the received label is a new one, then the MPLS processing section 21 makes a request to the switch setup section 22 for LSP setup (step S3) and sends a label mapping message (step S4), thereby terminating the processing. If, on the other hand, the received label is not a new one, step S4 is carried out directly.

Figure 11:
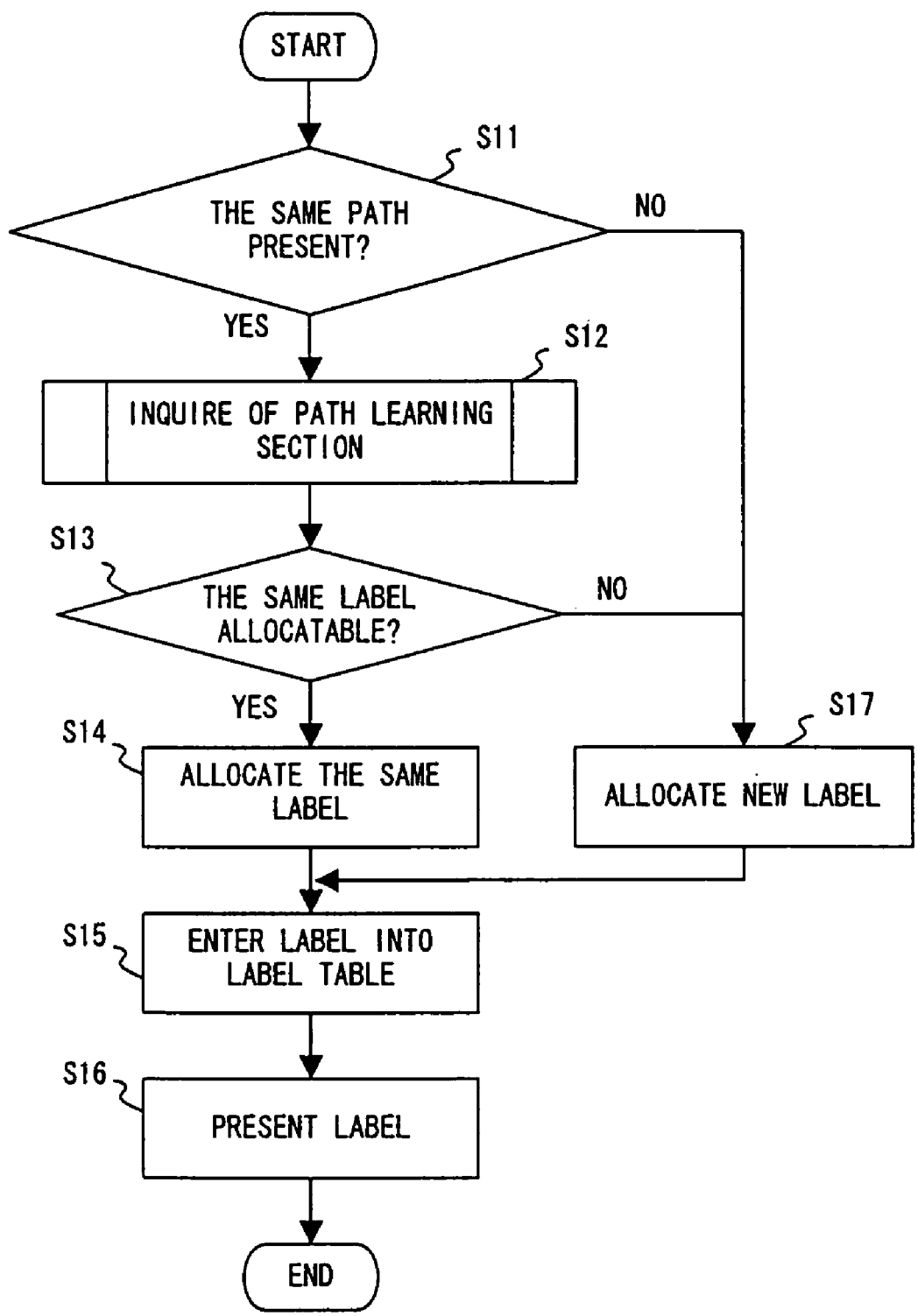
FIG. 11 is a flowchart for the first processing by the label management section.

FIG. 11 is a flowchart for the processing in step S1 of FIG. 10 by the label management section 23 which received the request for label allocation. First, the identical-path confirmation section 28 searches the label table to determine if there exists an LSP of the same path as the path contained in the label request message (step S11). If there exists such an LSP, then the confirmation section 28 inquires of the path learning section 25 as to whether the same label as that allocated to that LSP can be allocated (step S12) and checks the reply (step S13).

If the same label can be allocated, then it is allocated (step S14) and then entered into the label table (step S15). The entered label is presented to the MPLS processing section 21 (step S16), whereby the processing is terminated.

If no such LSP exists in step S11, then a new label is allocated (step S17) and steps S15 and S16 are carried out.

FIGS. 12 through 22 show an example of label reallocation when a change in network topology has occurred at identical-label allocation.

Figure 12:
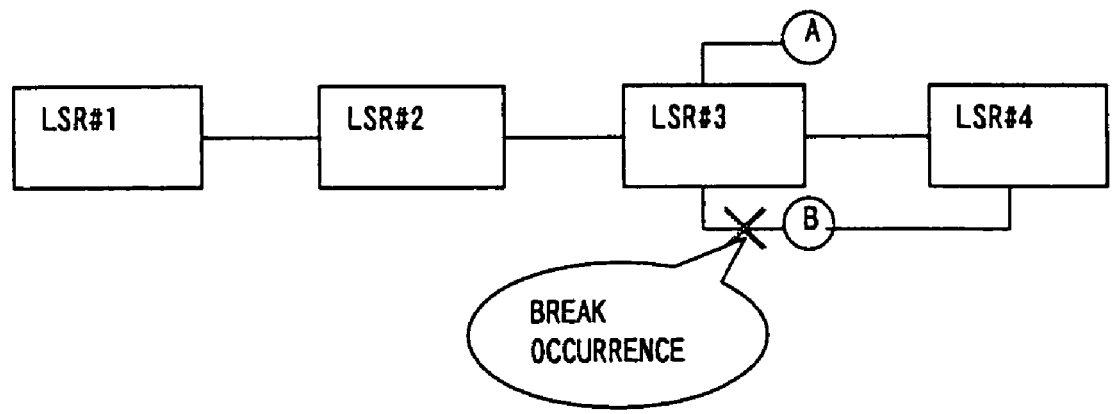
FIG. 12 shows a second network configuration.

It is assumed here that, in such a network configuration as shown in FIG. 12, an LSP has already been set up on the flow bound for network A and the flow bound for network B and the same label has been allocated for them. In this network configuration, LSR#1, LSR#2 and LSR#3 correspond to the ingress LSR, the transit LSR, and the egress LSR, respectively. The LSR#3 accommodates the networks A and B, and the LSR#4 accommodates the network B.

Figure 13:
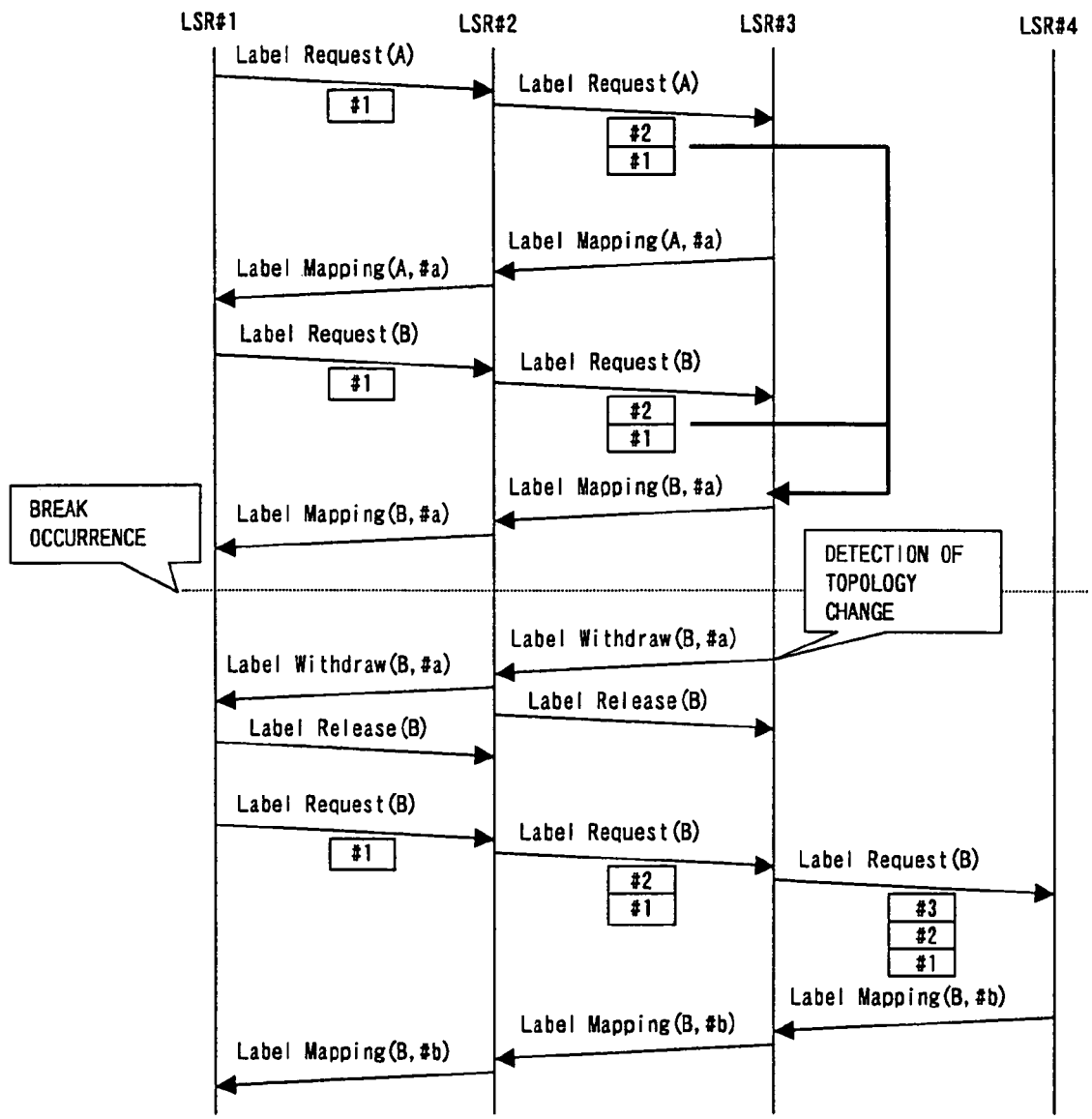
FIG. 13 shows a second message sequence.

Consider the case where a break occurs between the LSR#3 and the network B with a change in the network configuration. FIG. 13 shows a sequence of messages communicated among the LSRs in this example.

Figure 14:
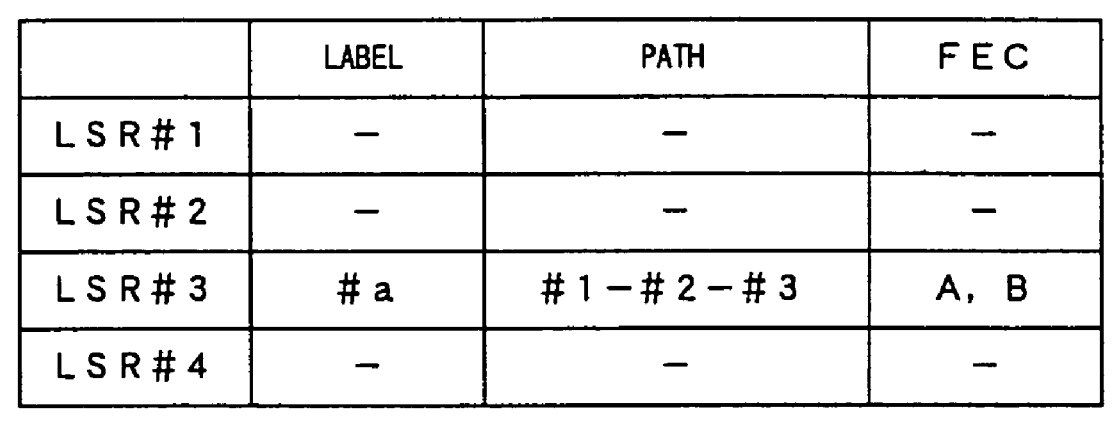

In FIG. 13, the sequence through the point of time at which a break occurs remains unchanged from that of FIG. 6. The label tables and the label lookup tables of the respective LSRs at this time are as depicted in FIGS. 14 and 15, respectively. In the label table of the LSR#3 in FIG. 14, the same label #a is allocated for two FECs as in FIG. 9.

When the LSR#3 detects the occurrence of a break and the routing protocol processing section 24 notifies the MPLS processing section 21 of a change in the path, the MPLS processing section 21 requests the label management section 23 to release the label of the flow bound for the network B.

Figure 16:
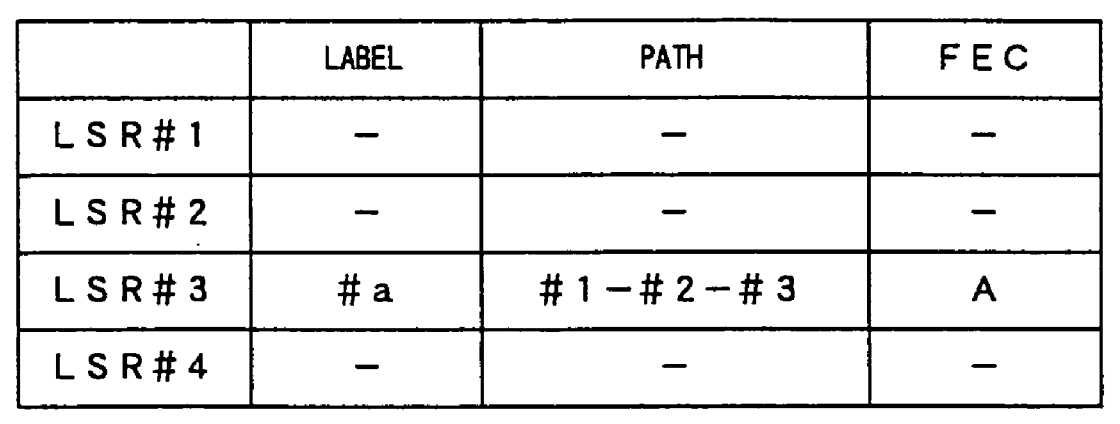

The label management section 23 searches the label table of FIG. 14 to release the corresponding label. At this point, since two FECs share the LSP of that label, only B is deleted from the FEC column without removing the entry itself of label #a. The released label #a is presented to the MPLS processing section 21. The contents of the label tables of the respective LSRs at this point are as depicted in FIG. 16.

To manage the association between labels and FECs, the MPLS processing section 21 holds a label-to-FEC mapping table in the memory 33 and updates this table on the basis of the result of label allocation by the label management section 23. The contents of the label-to-FEC mapping table of the LSR#3 at this point are as depicted in FIG. 17.

Figure 17:
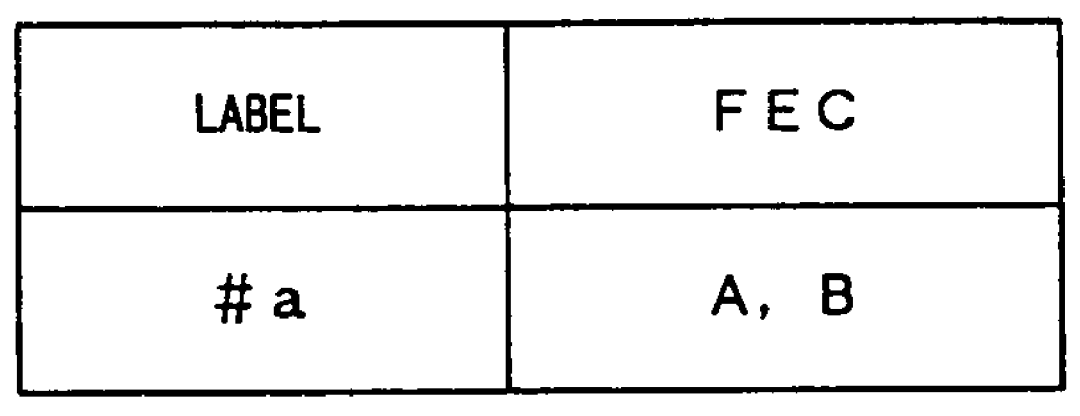

When notification that the label #a has been released is received from the label management section 23, the label reallocation section 26 of the MPLS processing section 21 refers to the label-to-FEC mapping table of FIG. 17 to delete B from the column on FEC corresponding to the label #a and confirms that the LSP is not required to be released.

Next, the MPLS processing section 21 sends a label withdraw message containing the destination B and the label #a to ask the LSR#1 to reperform LSP setup. The LSR#1 which received the label withdraw message sends a label release message.

Next, the LSR#1 sends a label request message for the flow bound for the network B. The identical-label confirmation section 28 in the LSR#4 which received that message adds LSR#4 to the top of the LSR list, #3–#2–#1, contained in the message and reverses the arrangement of elements in the list to create the path #1–#2–#3–#4. The label table is next searched to confirm that there is no LSP of the same path as that pass. The label management section 23 then allocates a new label #b.

The MPLS processing section 21 sends a label mapping message containing the destination B and the label #b. thereby, a new LSP is established on the path #1–#2–#3–#4. The contents of the label tables and the label lookup tables of the respective LSRs at this point are as depicted in FIGS. 18 and 19, respectively.

Figure 20:
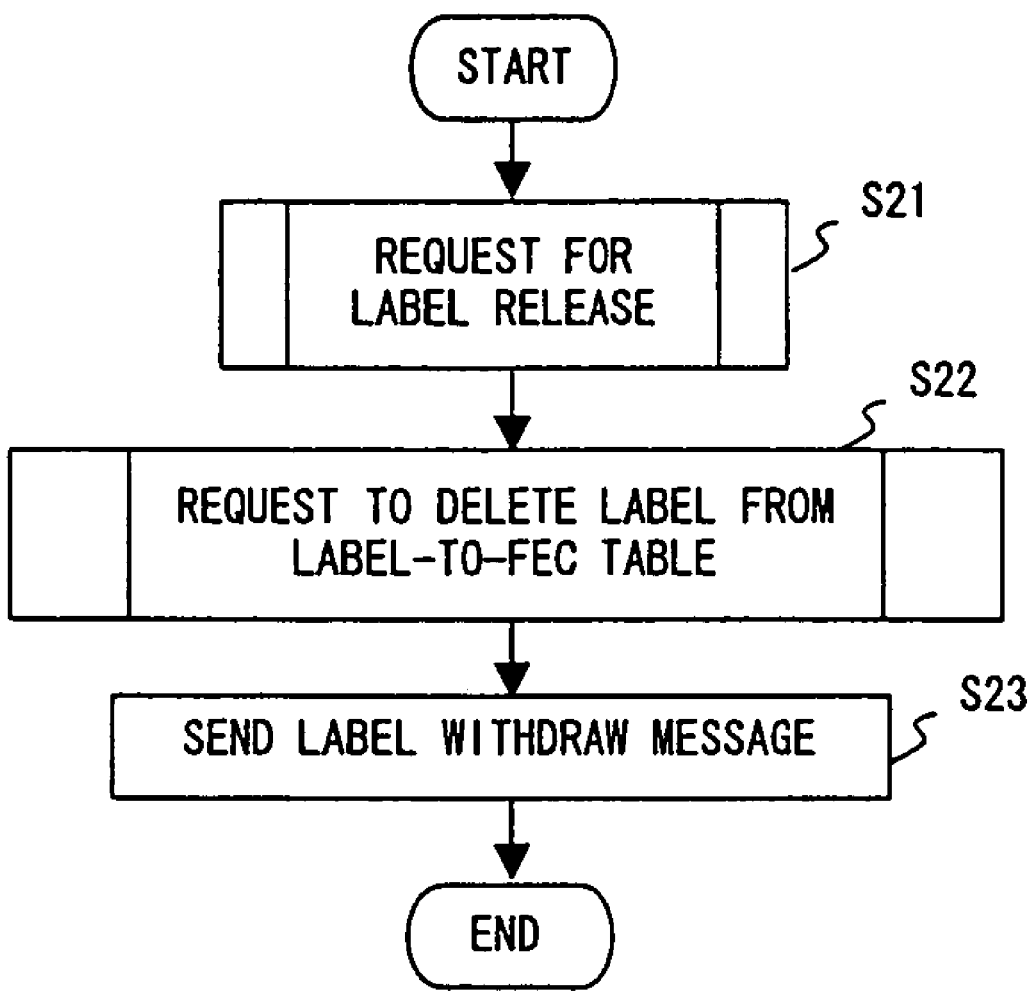
FIG. 20 is a flowchart for the second processing by the MPLS processing section.

FIG. 20 is a flowchart for the processing by the MPLS processing section 21 which receives from the routing protocol processing section 24 notification that a path change has been made. The MPLS processing section 21 first requests the label management section 23 to release a label on the basis of information on the changed path (step S21), then requests the label reallocation section 26 to delete information corresponding to the released label from the label-to-FEC table (step S22) and sends a label withdraw message (step S23).

Figure 21:
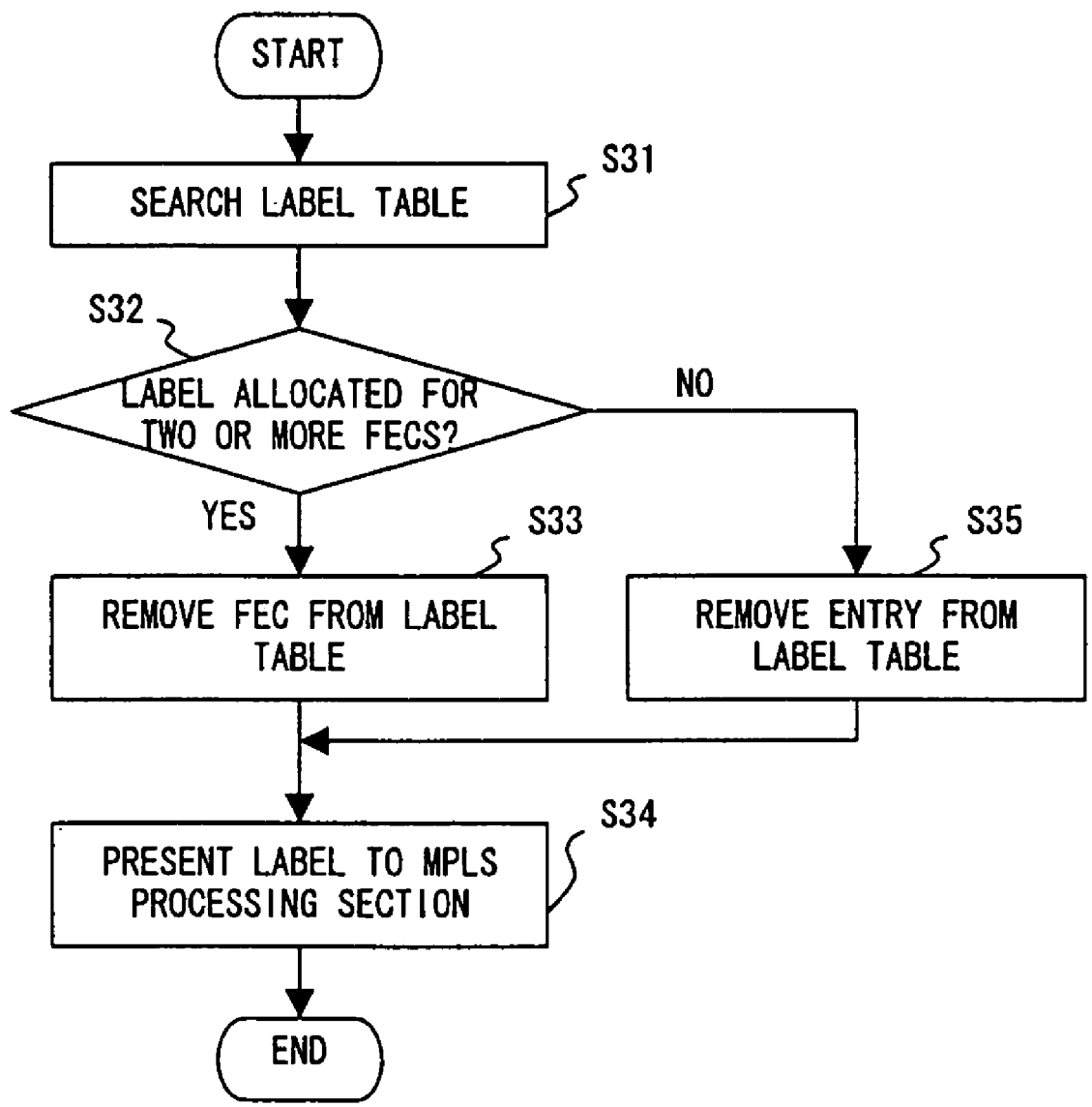
FIG. 21 is a flowchart for the second processing by the label management section.

FIG. 21 is a flowchart for the processing in step S21 of FIG. 20 by the label management section 23 which received the label release request from the MPLS processing section 21. The label management section first searches the label table (step S31) and then decides whether the label to be released is allocated for two or more FECs (step S32).

If the label is allocated for two or more FECs, then the FEC corresponding to the path change is deleted from the label table (step S33) and the label is then presented to the MPLS processing section 21 (step S34). If the label is allocated for a single FEC, the entry of the label is deleted from the label table (step S35) and step S34 is then carried out.

Figure 22:
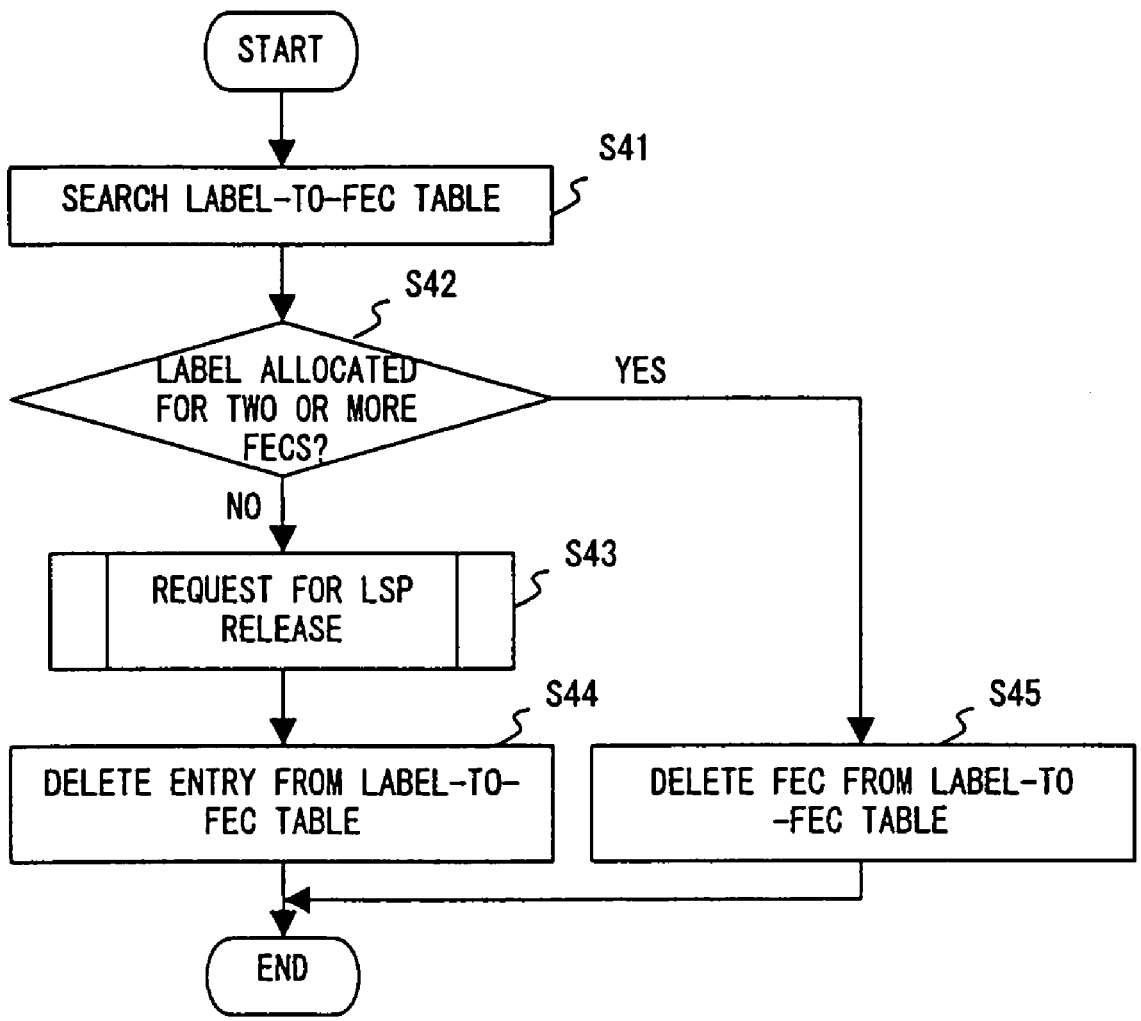
FIG. 22 is a flowchart for the label reallocation.

FIG. 22 is a flowchart for the processing in step S22 of FIG. 20 by the label reallocation section 26 which received the label release request from the MPLS processing section 21. The label reallocation section first searches the label-to-FEC table (step S41) and then decides if the released label is allocated for two or more FECs (step S42).

If the label is allocated for a single FEC, a request is made to the switch setup section 22 to release the corresponding LSP (step S43) and the entry of the label is deleted from the label-to-FEC table (step S44). If, on the other hand, the label is allocated for two or more FECs, the FEC associated with the path change is deleted from the entry of the label (step S45).

FIGS. 23 through 28 show an example of label allocation in the case where there exists on a path an LSR having no identical-label allocation function.

Figure 23:
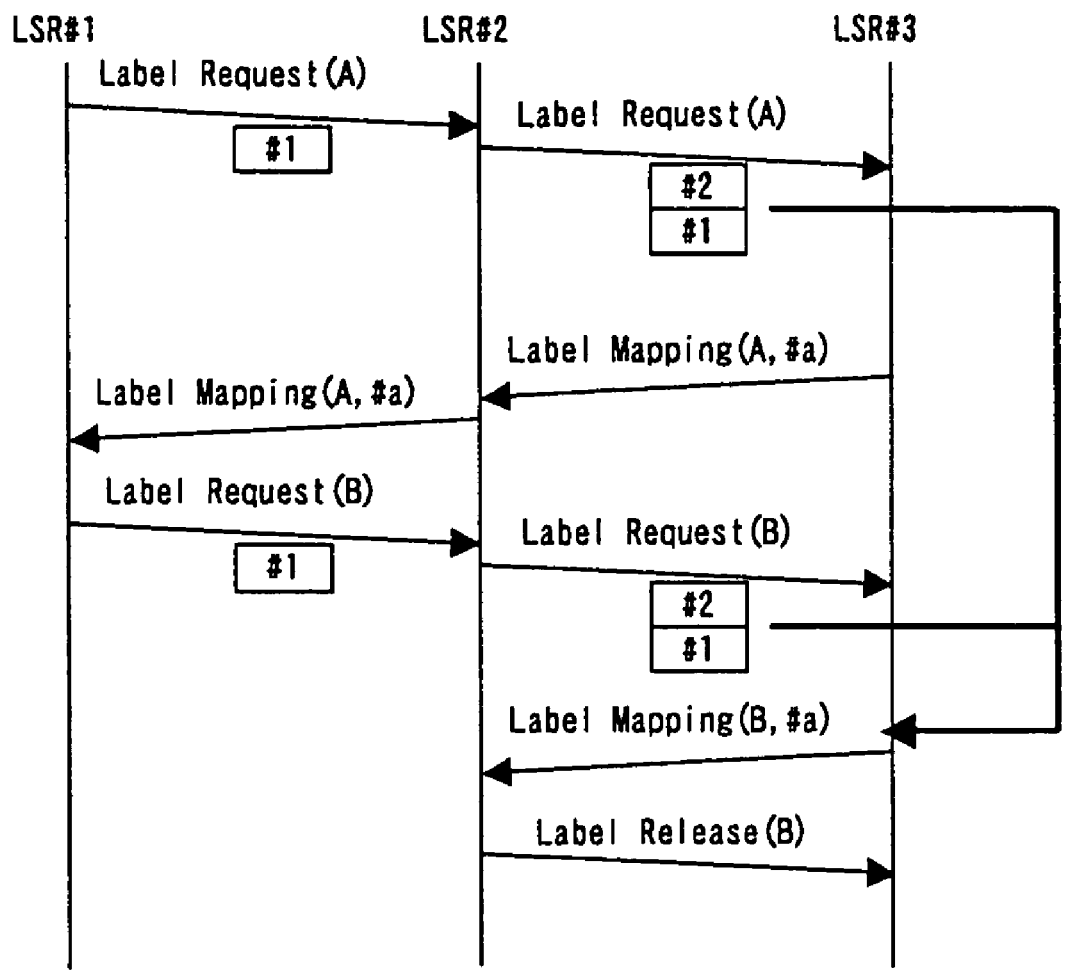
FIG. 23 shows a third message sequence.

Consider the case where, in the network configuration shown in FIG. 5, the LSR#2 has no identical-label allocation function. It is supposed that, when there exists first only the path to the network A and the corresponding LSPs have already been set up, the path to the network B is added. FIG. 23 shows a sequence of messages communicated among the LSRs.

In FIG. 23, the sequence through the point of time at which the LSP for the network A is set up remains unchanged from that of FIG. 6. The label tables and the label lookup tables of the respective LSRs at this time are as depicted in FIGS. 7 and 8, respectively.

Upon receipt of a label request message for the flow bound for the network B, the LSR#3 allocates the same label #a as that allocated to the flow for the network A and sends a label mapping message as in the case of FIG. 6. The contents of the label tables of the respective LSRs are as depicted in FIG. 9.

However, the LSR#2, having no identical-label allocation function, cannot allocate the label #a and therefore sends a label release message containing destination B to the LSR#3. Upon receipt of the label release message, the MPLS processing section 21 in the LSR#3 judges that the same label cannot be allocated for the path of the label #a and then makes a request to the label management section 23 for label release.

The label management section 23 then searches the label table of FIG. 7, releases the corresponding label #a, and presents the path #1–#2–#3 to the MPLS processing section 21. The different-label allocation processing section 27 in the MPLS processing section 21 then presents that path to the path learning section 25, which adds the presented path information to the identical-label non-allocatable path tree.

Figure 24:
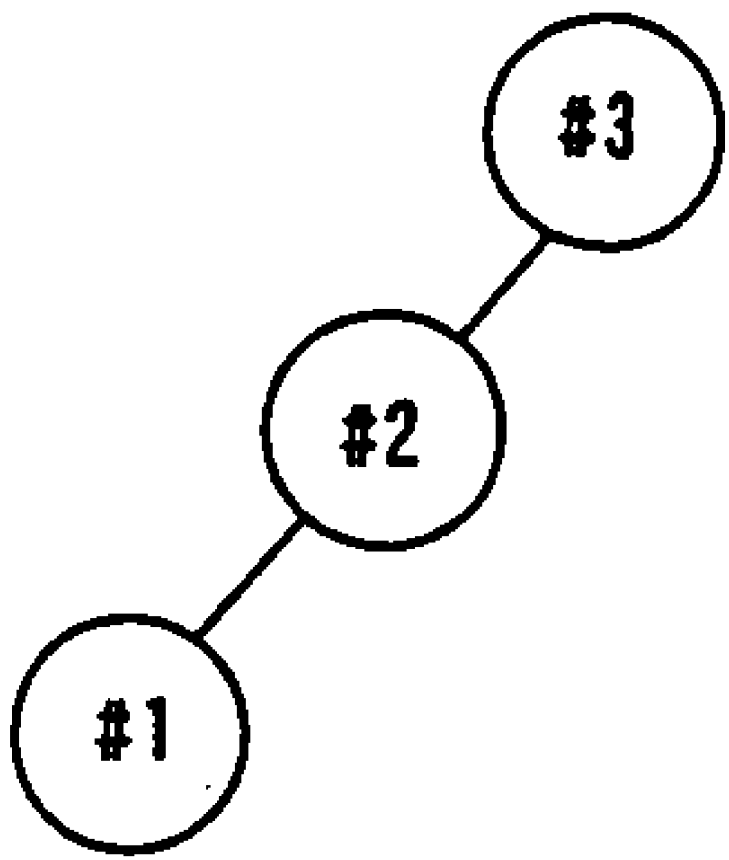
FIG. 24 shows a first identical-label non-allocatable path tree.

The identical-label non-allocatable path tree represents paths for which the same label cannot be allocated with the LSR (local node) that holds the tree as the root. Here, such an identical-label non-allocatable path tree as shown in FIG. 24 is created with LSR#3 as the root node.

Figure 25:
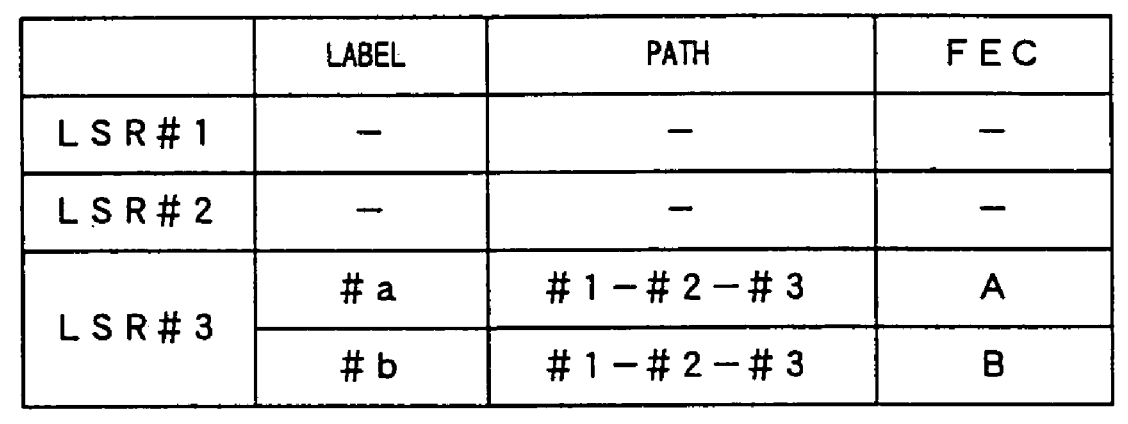

After that, the LSR#3 allocates a different label #b for the flow bound for the network B and then resends a label mapping message. Thus, the label tables and the label lookup tables as depicted in FIGS. 25 and 26, respectively, are set up in the LSRs.

Figure 27:
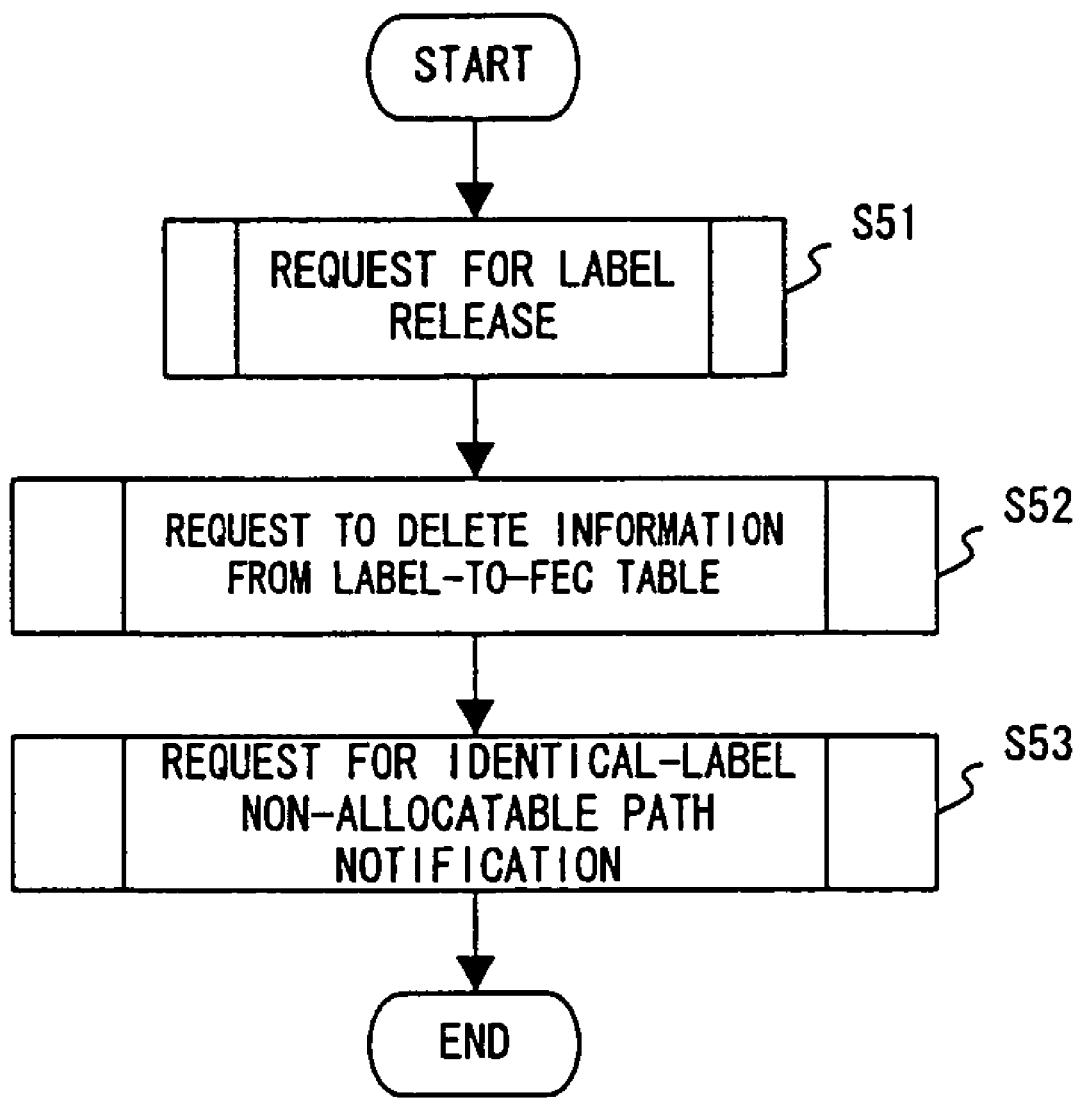
FIG. 27 is a flowchart for the third processing by the MPLS processing section.

FIG. 27 is a flowchart for the processing by the MPLS processing section 21 which receives the label release message. The MPLS processing section 21 first makes a request to the label management section 23 for label release (step S51) and then makes a request to the label reallocation section 26 to delete information corresponding to the released label from the label-to-FEC table (step S52).

Finally, the MPLS processing section 21 requests the different-label allocation section 27 for notification of the identical-label non-allocatable path (step S53). The processing in step S51 by the label management section 23 is the same as that shown in FIG. 21 and the processing in step S52 by the label reallocation section 26 is the same as that shown in FIG. 22.

Figure 28:
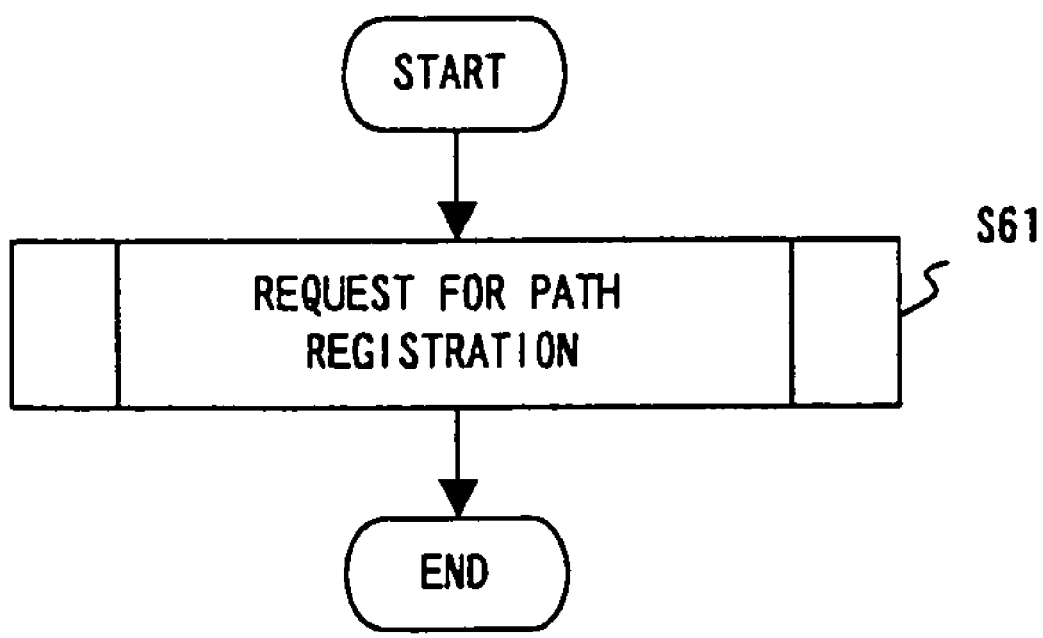
FIG. 28 is a flowchart for the other label reallocation.

FIG. 28 is a flowchart for the processing in step S53 of FIG. 27 by the different-label allocation section 27 receiving the request for path notification from the MPLS processing section 21. The different-label allocation section makes a request to the path learning section 25 to enter the path presented from the label management section 23 (step S61). In response to this, the path learning section enters the path into the identical-label non-allocatable path tree.

Figure 29:
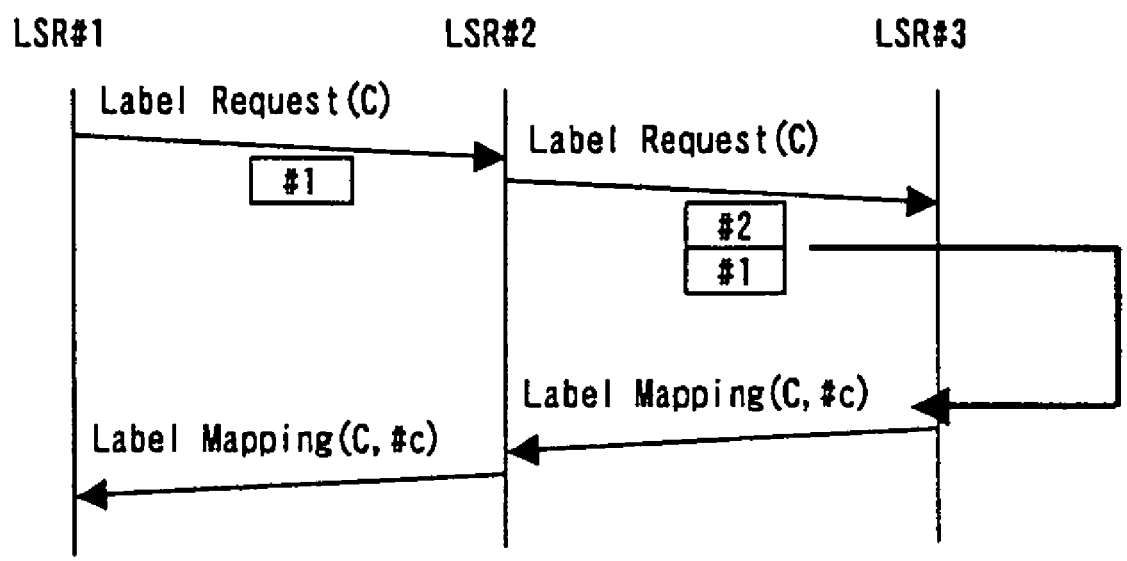
FIG. 29 shows a fourth message sequence.

FIGS. 29 through 31 show an example of label allocation in the case where the path learning section 25 has learned that there exists on a path an LSR having no identical-label allocation function.

It is assumed that the path learning section has learned that, in the network configuration of FIG. 5, LSP has already been set up on the flow bound for the network A and the flow bound for the network B and there exists an LSR having no identical-label allocation function on the path #1–#2–#3. And consider that a path to the network C is added anew. FIG. 29 shows a sequence of messages communicated among the LSR in this example.

The MPLS processing section 21 in the LSR#3 receives a label request message for the flow for the network C and then makes a request to the label management section 23 for label allocation. The label management section 23 recognizes that there exists an LSP of the same path as the path #1–#2–#3 as the result of search by the identical-path confirmation section 28 and inquires of the path learning section 25 as to whether the same label can be allocated.

The path learning section 25, which holds the identical-label non-allocatable path tree as shown in FIG. 24, searches the tree starting with the root, then recognizes that the path #1–#2–#3 has been entered and notifies the label management section 23 that the identical label cannot be allocated.

As a result, the label management section 23 allocates a label #c anew, notifies the MPLS processing section 21 to that effect, and updates the label table. The MPLS processing section 21 makes a request to the switch setup section 22 for LSP setup and sends a label mapping message containing destination C and label #c. Thus, the label tables and the label lookup tables as depicted in FIGS. 30 and 31, respectively, are set up in the LSRs.

FIGS. 32 through 37 show an example of registration/search of an identical-label non-allocatable path tree by the path learning section 25.

Figure 32:
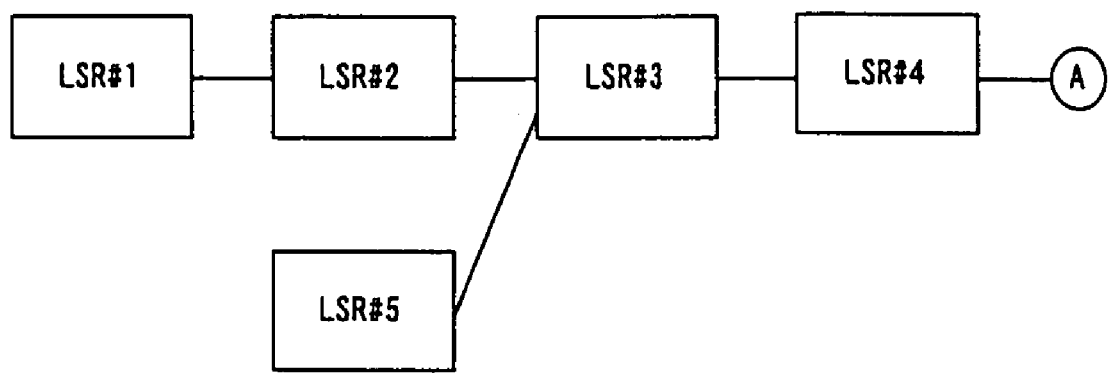
FIG. 32 shows a third network configuration.

Consider that, in such a network configuration as shown in FIG. 32, the LSR#3 has no identical-label allocation function. If, when an LSP is set up on the flow bound for network A from the LSR#2, the same label cannot be allocated, the identical-label non-allocatable path tree in the LSR#4 will be as depicted in FIG. 33, in which the LSR#4 is the root node.

Figure 33:
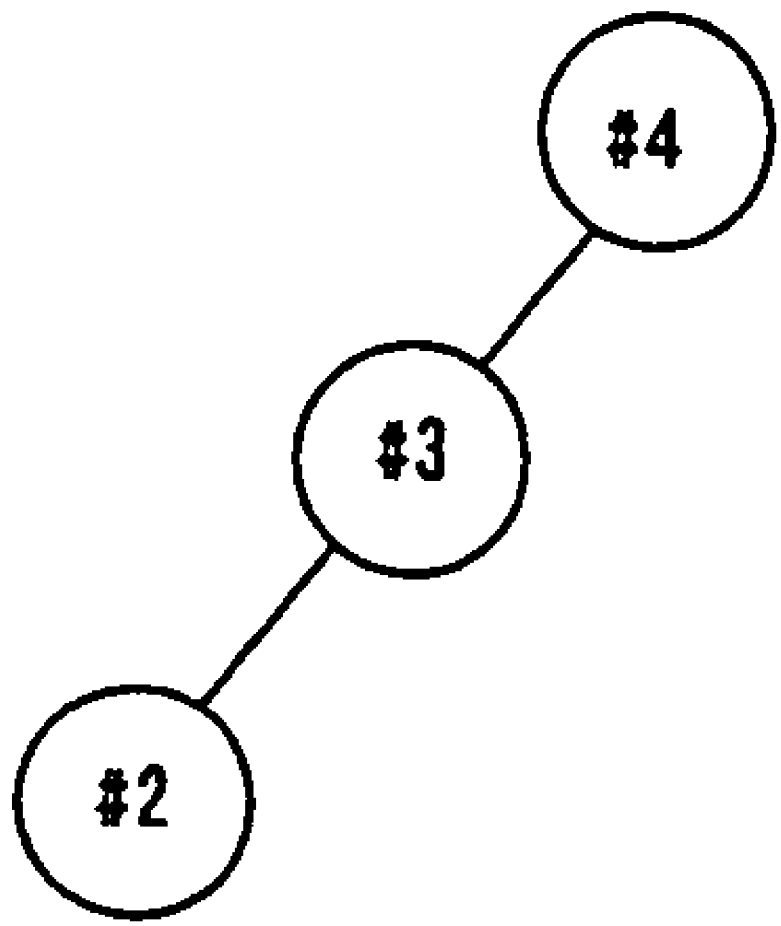
FIG. 33 shows a second identical-label non-allocatable path tree.

When, in setting up an LSP on LSR#1–LSR#2–LSR#3–LSR#4, the identical-label non-allocatable path tree of FIG. 33 is examined based on a path vector in a label request message, the path #2–#3–#4 hits the tree. In this case, the path on which LSP is to be set up does not perfectly match the path represented by the identical-label non-allocatable path tree; however, the latter corresponds to a partial set of path segments in the former. In such a case as well, the path learning section 25 judges that the same label cannot be allocated.

When an LSP is set up on LSR#5–LSR#3–LSR#4, the #3–#4 portion of that path matches a segment of the identical-label non-allocatable path tree. However, since LSR#3 is not the terminal node and has a child node LSR#2, the path learning section 25 does not consider the path #5–#3–#4 to hit the tree and judges that the same label can be allocated.

Here, the LSR#4 sends a label mapping message, while the LSR#3, being not able to allocate the same label, sends a label release message. The different-label allocation section 27 in the LSR#4 receiving the label release message requests the path learning section 25 to enter the path #5–#3–#4 into the identical-label non-allocatable path tree. As a result, the identical-label non-allocatable path tree becomes as depicted in FIG. 34.

Figure 34:
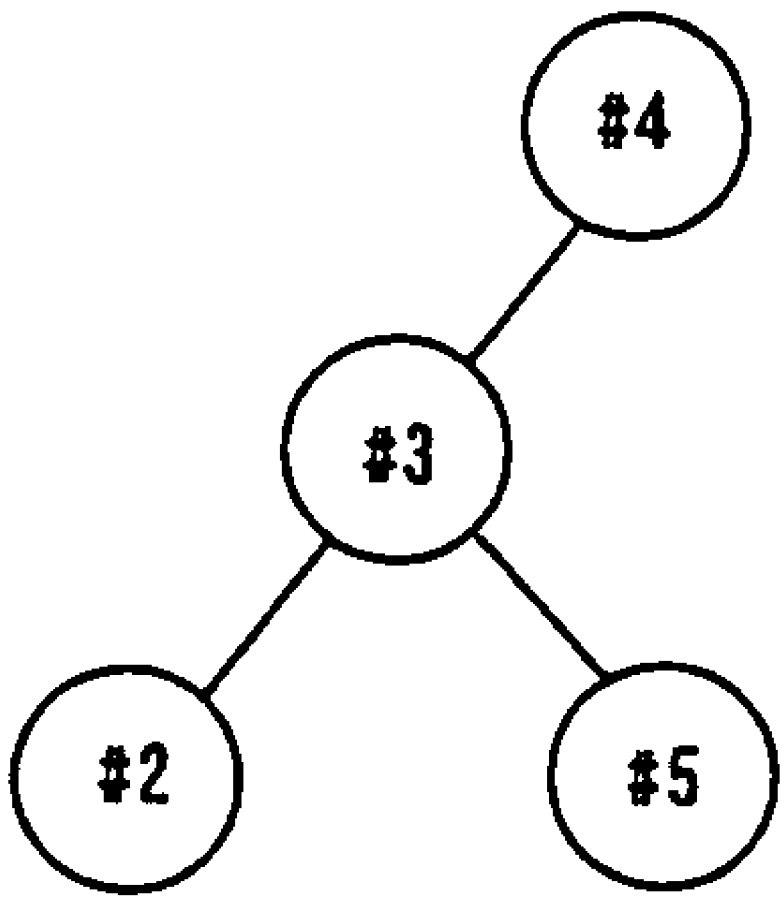
FIG. 34 shows a third identical-label non-allocatable path tree.

When an LSP is set up on LSR#3–LSR#4, the identical-label non-allocatable path tree of FIG. 34 is searched. When the tree is followed through LSR#3, a match is found with the #3–#4 portion. However, since the LSR#3 has two child nodes, it cannot be concluded that the path #3–#4 cannot be allocated the same label. The path learning section 25 therefore judges that the same label can be allocated.

Here, the LSR#4 sends a label mapping message, while the LSR#3, being not able to allocate the same label, sends a label release message again. The different-label allocation section 27 in the LSR#4 requests the path learning section 25 to enter the path #3–#4 into the identical-label non-allocatable path tree.

Figure 35:
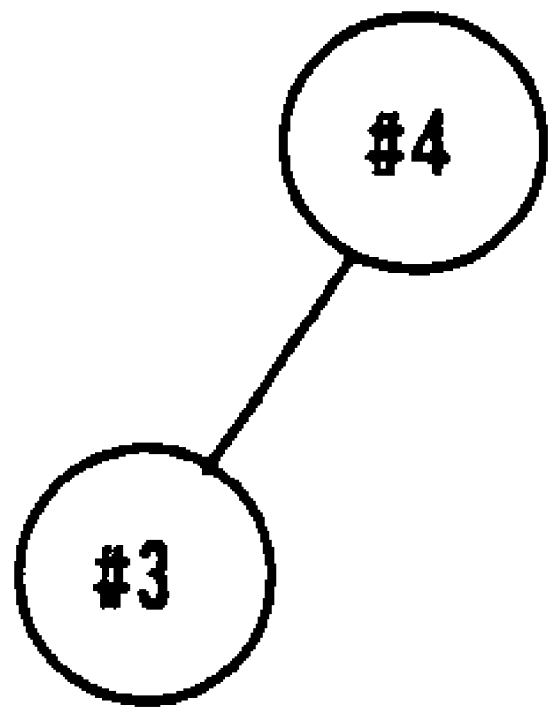
FIG. 35 shows a fourth identical-label non-allocatable path tree.

At this point, the path learning section 25, knowing that the path #3–#4 is already present on the tree, deletes all the child nodes of the LSR#3. As a result, the identical-label non-allocatable path tree becomes as depicted in FIG. 35.

Figure 36:
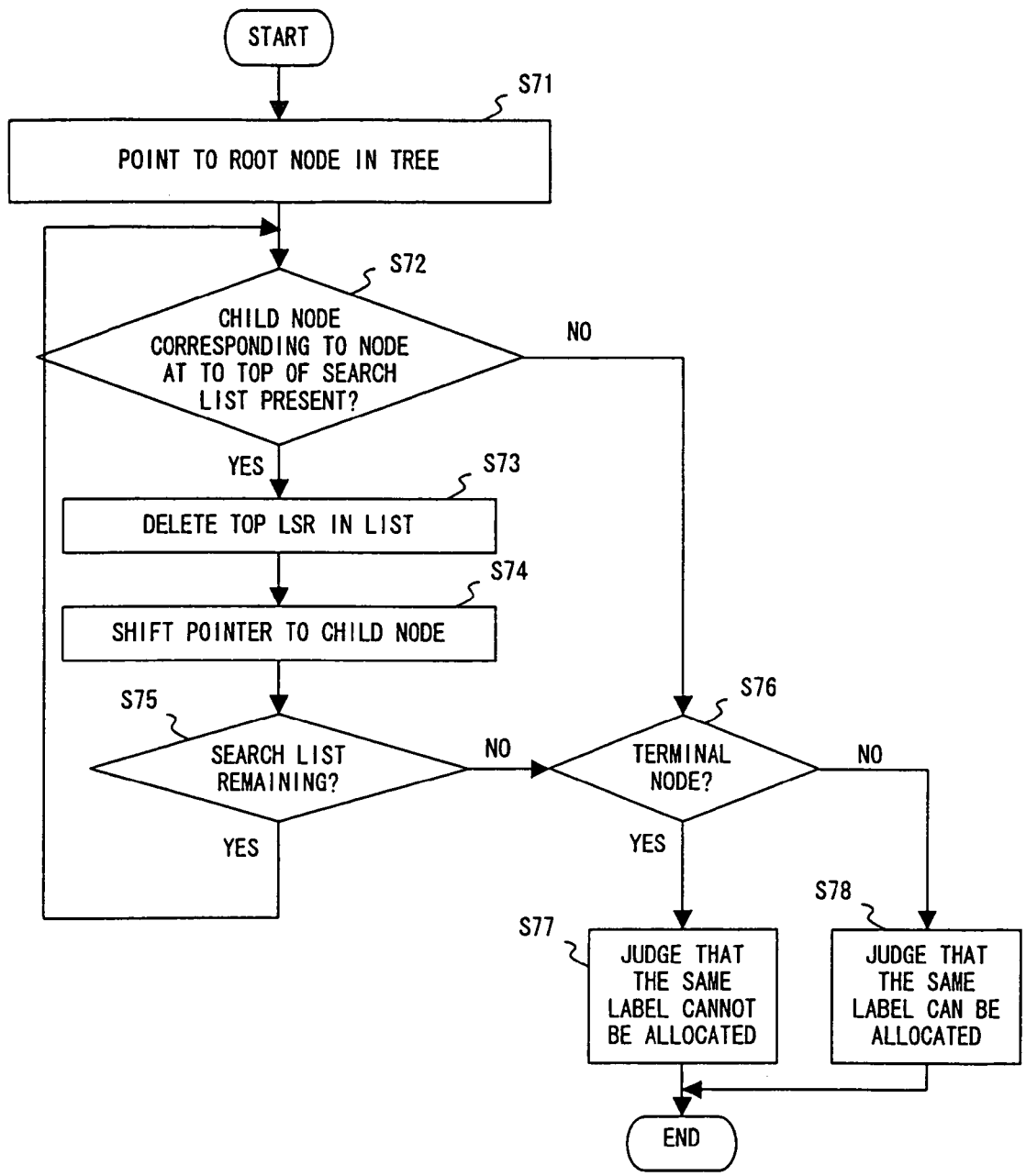
FIG. 36 is a flowchart for retrieval.

FIG. 36 is a flowchart for the search processing for the identical-label non-allocatable path tree in step S12 of FIG. 11 by the path learning section 25 receiving an inquiry from the label management section 23. The path learning section 25 points to the root node in the tree by a tree pointer (step S71) and then, using the path vector in the label request message corresponding to the path of inquiry as a search list, decides if the node pointed to by the tree pointer has a child node that coincides with the node at the top of the search list (step S72).

If the node pointed to by the tree pointer has such a child node, then the LSR at the top of the search list is deleted (step S73) and the tree pointer is moved to that child node (step S74). A decision is then made as to whether the search list remains (step S75). If the search list remains, the procedure is repeated starting with step S72.

If, in step S72, the node pointed to by the tree pointer has no child node that coincides with the top of the search list, then a decision is made as to whether that node is the terminal node (step S76). Here, a node that has no child node is regarded as the terminal node.

If the node pointed to by the tree pointer is the terminal node, then it is judged that the same label cannot be allocated because the path of inquiry has been entered into the tree (step S77). If, on the other hand, the node pointed to by the tree pointer is not the terminal node, then it is judged that the same label can be allocated because the path of inquiry is not entered into the tree (step S78). If, in step S74, the search list does not remain, then the procedure goes to step S76.

For example, if an inquiry about path #1–#2–#3–#4 is received when the identical-label non-allocatable path tree of FIG. 33 is held, the path learning section 25 searches the tree using the corresponding path vector #3–#2–#1 as the search list.

First, when the root node #4 is pointed to by the tree pointer, this node has data #3 at the top of the search list as a child node. The data #3 is therefore deleted from the search list and the search list remains as #2–#1. The tree pointer is shifted to the child node #3.

Then, since the node #3 has data #2 at the top of the search list as a child node, the data #2 is deleted from the search list and the search list remains as #1. The tree pointer is shifted to the child node #2. Since the node #2 is the terminal node, it is judged that the same label cannot be allocated.

FIG. 37 is a flowchart for the registration processing for the identical-label non-allocatable path tree in step S61 of FIG. 28 by the path learning section 25 receiving a request for path registration. The path learning section 25 points to the root node in the tree by the tree pointer (step S81) and then, using the path vector in the label request message corresponding to the path presented as an search list, decides if the node pointed to by the tree pointer has a child node that coincides with the node at the top of the registration list (step S82).

If the node pointed to by the tree pointer has such a child node, then the LSR at the top of the registration list is deleted (step S83) and the tree pointer is shifted to that child node (step S84). A decision is then made as to whether the registration list remains (step S85). If the registration list remains, the procedure is repeated starting with step S82.

If, in step S82, the node pointed to by the tree pointer has no child node that coincides with the node at the top of the registration list, then the node at the top of the registration list is added as a child node (step S86) and the procedure then goes to step S83. If, in step S85, the registration list is exhausted, then a decision is made as to whether the node pointed to by the tree pointer is the terminal node (step S87).

If the node pointed to by the tree pointer is the terminal node, then the procedure comes to an end. If, on the other hand, the node pointed to by the tree pointer is not the terminal node, its child nodes are all deleted (step S88), whereby the procedure is terminated.

For example, if a registration request for path #3–#4 is received when the identical-label non-allocatable path tree of FIG. 34 is held, the path learning section 25 searches the tree using the corresponding path vector #3 as the registration list.

First, when the root node #4 is pointed to by the tree pointer, this node has data #3 at the top of the registration list as a child node. The data #3 is therefore deleted from the registration list, so that the registration list becomes exhausted. The tree pointer is then shifted to the child node #3. Since the child node #3 is not the terminal node, its child nodes #2 and #5 are deleted, so that such a tree as shown in FIG. 35 remains.

Reference will now be made to FIGS. 38 through 42 for comparisons in the number of LSPs required between the LSP setup of the invention and the conventional LSP setup.

First, consider the case where the ingress LSR and the egress LSR are connected directly and the egress LSR accommodates a number m of networks. In this case, with the conventional LSP setup using RIP, the number of LSPs set up between the ingress LSR and the egress LSR is m. In contrast, with the inventive LSP setup, since only a single LSP is required, the number of LSPs is reduced by a factor of m.

Figure 38:
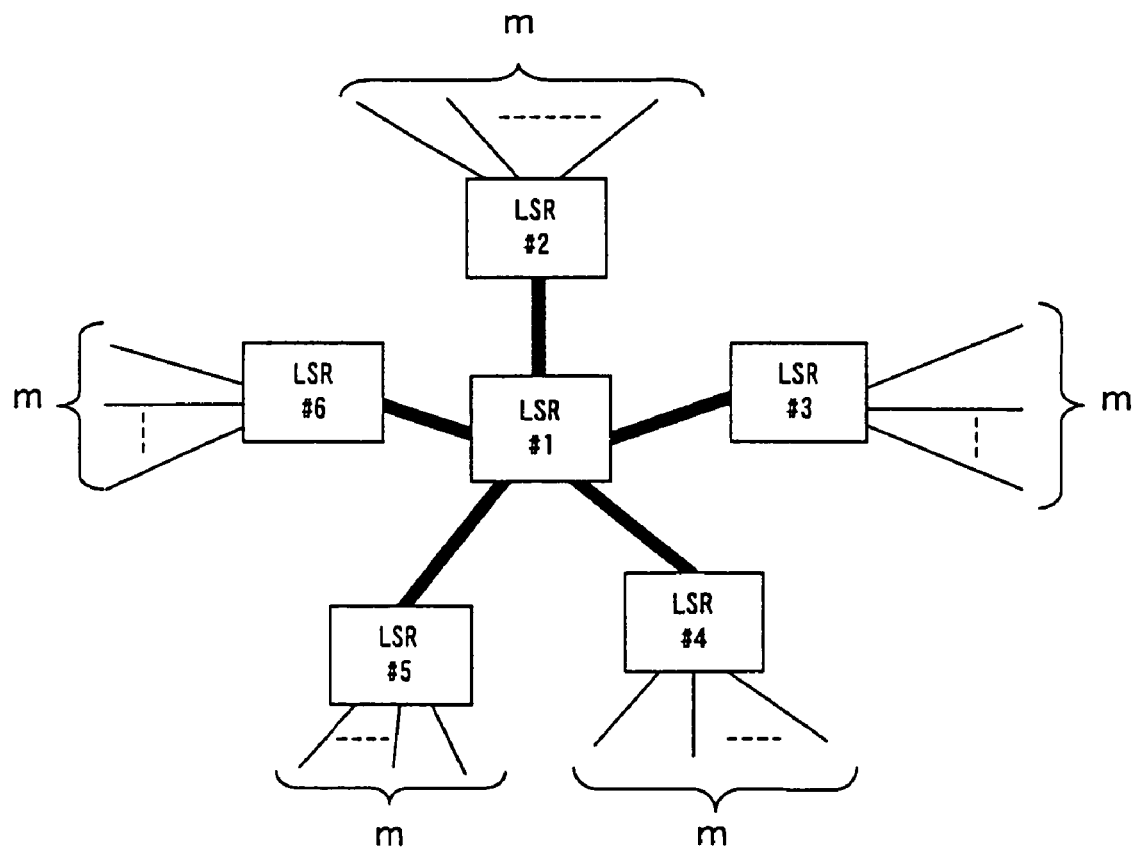
FIG. 38 shows a fourth network configuration.

Next, comparisons are made in the number of LSPs in a more complex network configuration. FIG. 38 shows a network configuration such that six LSRs are star-connected to form an MPLS domain and each of the five peripheral LSRs accommodates m networks for non-MPLS domain. Here, we consider a more general configuration such that n LSRs are star-connected and calculate the number of LSPs required for the central LSR#1.

With the conventional LSP setup using RIP, the number of combinations of networks for a non-MPLS domain is $_{m(n-1)}C_2 = m(n-1)\{m(n-1)-1\}/2$. The number of combinations of networks under the same LSR is $_mC_2 \times (n-1) = m(m-1)(n-1)/2$. The number of transit operation LSPs required by the LSR#1 for the non-MPLS domain is therefore calculated by $$\text{the number of transit operation LSPs} = [m(m-1)\{m(m-1)-1\}/2] \times 2 - [m(m-1)(n-1)/2] \times 2 \; m^2n^2 - 3m^2n + 2m^2 \quad (1)$$

The number of ingress operation LSPs required for the non-MPLS domain is calculated by $$\text{the number of ingress operation LSPs} = m(n-1) \quad (2)$$

From equations (1) and (2), the number of LSPs required for the non-MPLS domain is calculated to be $$m^2(n^2-3n+2) + m(n-1) = m^2n^2 - 3m^2 + mn + 2m^2 - m$$

As for LSPs from the peripheral LSR#2, . . . , LSR#n to networks within MPLS domain, since the LSR#1 performs an egress operation, the number of LSPs required is calculated by the number of egress operation LSPs $$= (n-2) \times (n-1) \quad (4)$$
$$= n^2 - 3n + 2$$

Thus, the total number of LSPs required by the LSR#1 corresponds to the sum of the numbers in equations (3) and (4) and is given by $$m^2n^2-3m^2+mn+2m^2-m+n^2-3n+2=(m^2+1)n^2-(3m^2-m+3)n+2m^2-m+2 \quad (5)$$

In contrast, in the inventive LSP setup, the LSR#1 requires one LSP for each of transmission and reception toandfromanotherLSR. Thus, the number of LSPs required is calculated by the number of ingress operation LSPs +the number of egress operation LSPs $$=(n-1)+(n-1)=2n-2 \quad (6)$$

The number of combinations of LSRs other than the LSR#1 is $_{(n-1)}C_2=(n-1)(n-2)/2$. The number of LSPs required for transit operation among these LSRs is therefore calculated by the number of transit operation LSPs $$= [(n-1)(n-2)/2] \times 2 \quad (7)$$
$$= n^2 - 3n + 2$$

Thus, the total number of LSPs required by the LSR#1 corresponds to the sum of the numbers in equations (6) and (7) and is given by $$2n-2+n^2-3n+2=n^2-n \quad (8)$$

FIG. 39 shows the calculations of the number of LSPs in the conventional technique and the invention for n=10, 20, 39, 40, and 50 with m=5. The number of LSPs in the conventional technique is calculated according to equation (5), while the number of LSPs in the invention is calculated according to equation (8). Here, putting the number of LSPs in the conventional technique/the number of LSPs in the invention as a, since the number of LSPs in the invention is reduced by a factor of a in comparison with the conventional technique, the search time for the label lookup table is likewise reduced by the same factor. The results in FIG. 39 are represented by line graphs shown in FIG. 40.

FIG. 41 shows the calculations of the number of LSPs in the conventional technique and the invention for n=10, 20, 39, 40, and 50 with m=10. The results in FIG. 41 are represented by line graphs shown in FIG. 42.

Figure 40:
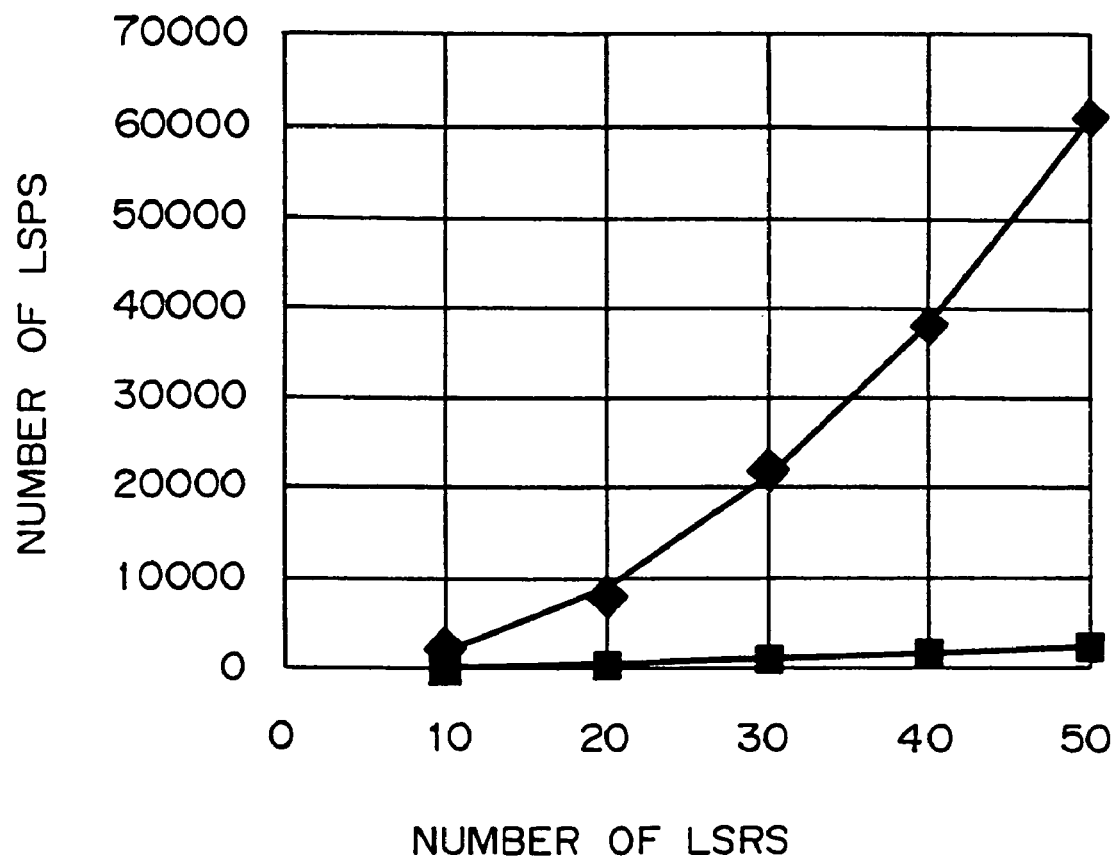
FIG. 40 shows a first graph of the number of LSPs versus the number of LSRs.
Figure 42:
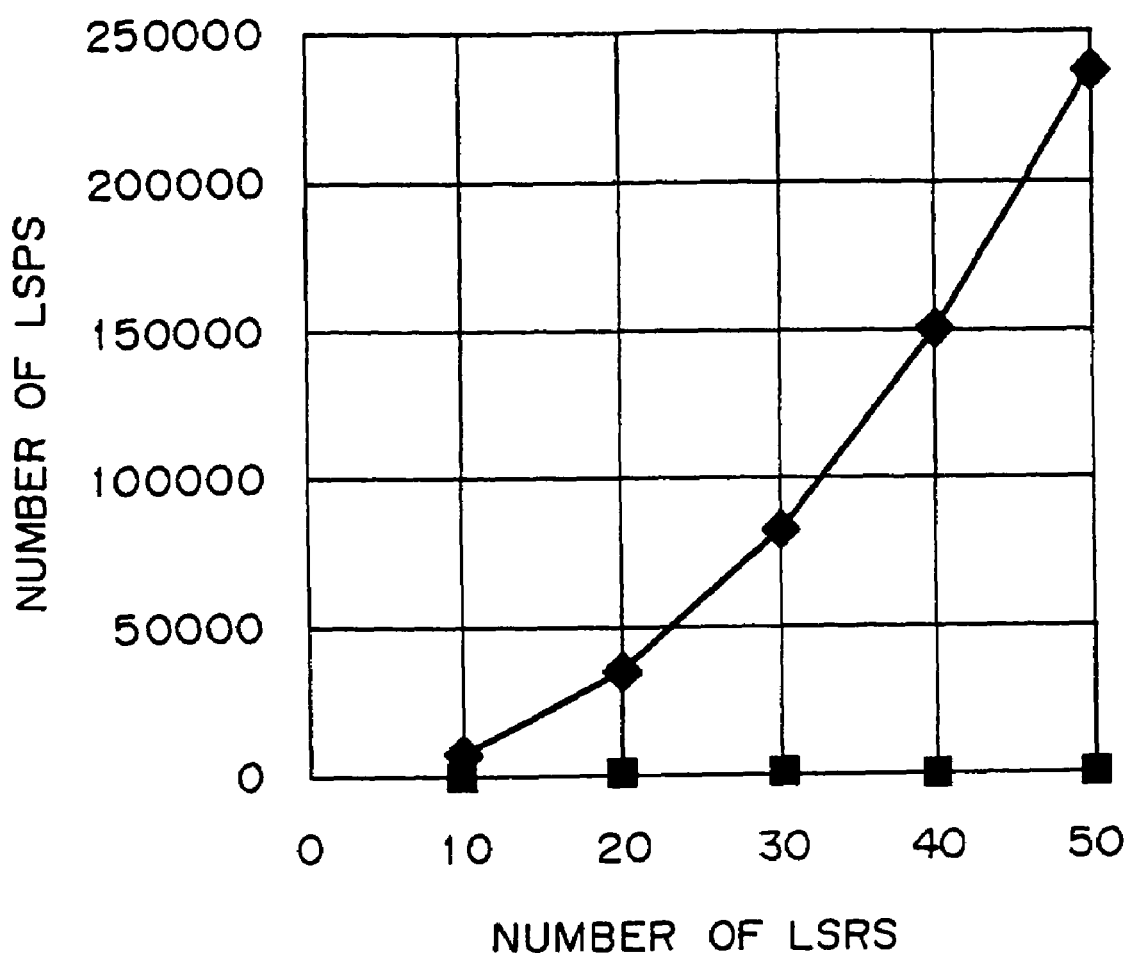
FIG. 42 shows a second graph of the number of LSPs versus the number of LSRs.

As can be seen from FIGS. 40 and 42, even in more complex network configurations, the LSP setup of the invention allows the number of LSPs required to be reduced significantly. A reduction in the number of LSPs results in a reduction in the number of labels used. There is a consequent reduction in the number of entries in the label lookup table, leading to a reduced label search time at the time of packet transfers. As a result, the load imposed on packet transfer processing can be reduced.

Since the search on the label table by the identical-path confirmation section 28 of FIG. 38 and the search on the identical-label non-allocatable path tree by the path learning section 25 are made only at LSP setup time, the search time has no effect on the packet transfer time.

The present embodiment, being reduced in the number of LSPs to be managed, ensures ease of maintenance and management of the LSPs and ease of understanding of the entire network. For example, when the number of LSRs is 10 in FIG. 41, the invention requires only 90 LSPs, in contrast to the conventional technique, which requires 7,362 LSPs. Also, since inexpensive LSRs in which the number of LSPs that can be set up is small can be used, the system installation costs can be reduced.

Although the embodiment has been described in terms of packet transfer in IP networks, the invention is also applicable to any other label switching network.

According to the present invention, since the number of labels used in a label switching network is reduced and the load on packet transfer is reduced, transfer capability of the network is improved. It therefore becomes possible to construct a practical label switching network using a distance vector type routing protocol which is relatively easy to manage instead of OSPF which is difficult to manage at the time of operation of the network. In addition, the maintenance and management of LSPs can be made easy, allowing system installation costs to be reduced.

What is claimed is:

1. A path setup device for setting up a label switched path in a label switching network including a plurality of routers, comprising:
    a decision device, when a label request is received, deciding whether there exists a label switched path which has already been set up and which corresponds to a path requested in the label request;
    a label allocation device, when the set-up label switched path exists, allocating another label, for the label request, which is the same as a label of the set-up label switched path;
    a different-label allocation device, when a request to release the another label is received from a router notified of said another label, performing processing for allocating a label different from the label of the set-up label switched path for the label request requesting a path corresponding to the set-up label switched path; and
    a path learning device automatically learning a path that cannot be allocated with a same label and prohibiting allocation of said same label for the learned paths wherein
    when a request to release said same label has been received, the different-label allocation device notifies the pat learning device of the path and the path learning device learns the notified path as a path that cannot be allocated same label.

2. The path setup device according to claim 1, wherein the decision device decides that the path corresponding to the label request is the same as the set-up label switched path when the path corresponding to the label request and the set-up label switched pat coincide with each other in a combination of an ingress router and an egress router and routers located between the ingress router and the egress router.

3. The path setup device according to claim 1, farther comprising
    a label reallocation device performing label reallocation processing, and wherein the label allocation device allocates other labels which are the same for a plurality of forwarding equivalence classes, and when a change has occurred in the label switching network for one of the forwarding equivalence classes, the label reallocation device temporarily releases a label allocated to a path between an ingress router and an egress router and performs processing for reperforming label allocation between the ingress router and the egress router.

4. A computer-readable recording medium recorded with a program for setting up a label switched path in a label switching network including a plurality of routers, the program causing a computer to perform:

when a label request is received, deciding whether there exists the label switched path which has already been set up and which corresponds to a path requested in the label request; when the set-up label switched path exists, allocating another label, for the label request which is the same as a label of the set-up label switched path;

when a request to release another label is received from a router notified of said other label, performing processing for allocating a label different from the label of the set-up label switched path for the label request having a path corresponding to the set-up label switched path; and automatically learning a path that cannot be allocated with a same label prohibiting allocation of label for the learned path, and when a request to release the said same label has been received, learning the learned path as a path that cannot be allocated same label.

5. A path setup method for setting up a label switched path in a label switching network including a plurality of routers, comprising:

when a label request is received, deciding whether there exists the label switched path which has already been set up and which corresponds to a path requested in the label request; when the set-up label switched pat exists, allocating another label, for the label request, which is the same as a label of the set-up label switched path;

when the set-up label switched path does not exist, allocating a new label for the label request;

when a request to release another label is received from a router notified of said other label, performing processing for allocating a label different from the label of the set-up label switched path for the label request having a path corresponding to the set-up label switched path; and automatically learning a path that cannot be allocated with a same label and prohibiting allocation of said same label for the learned path, and when a request to release said same label has been received, learning the learned path as a path that cannot be allocated said same label.

6. A path setup device for setting up a label switched path in a label switching network including a plurality of routers comprising:

decision means for, when a label request is received, deciding whether there exists the label switched pat which has already been set up and which corresponds to a path requested in the label request;

label allocation means for, when the set-up label switched pat exists, allocating another label, for the label request, which is the same as a label of the set-up label switched path;

a different label allocation means for, when a request to release another label is received from a router notified of said another label, performing processing for allocating a label different from the label of the set-up label switched path for the label request corresponding to a same path; and a path learning means for automatically learning a path that cannot be allocated with a same label and prohibiting allocation of said same labels for the learned path, and when a request to release another label has been received, the different-label allocation means notifies the path learning means of the path and the pat learning means learns the notified pat as a path that cannot be allocated said same label.

* * * * *